(12) United States Patent
Chen et al.

(10) Patent No.: US 11,327,194 B2
(45) Date of Patent: May 10, 2022

(54) METHOD FOR IDENTIFYING BOUNDARY OF SEDIMENTARY FACIES, COMPUTER DEVICE AND COMPUTER READABLE STORAGE MEDIUM

(71) Applicant: PETROCHINA COMPANY LIMITED, Beijing (CN)

(72) Inventors: Qilin Chen, Beijing (CN); Xingmiao Yao, Beijing (CN); Changkuan Ni, Beijing (CN); Bo Yan, Beijing (CN); Huaqing Liu, Beijing (CN); Guangmin Hu, Beijing (CN); Zhong Hong, Beijing (CN); Haichao Jiao, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 106 days.

(21) Appl. No.: 16/988,019

(22) Filed: Aug. 7, 2020

(65) Prior Publication Data
US 2021/0041588 A1 Feb. 11, 2021

(30) Foreign Application Priority Data
Aug. 9, 2019 (CN) .............................. 201910733457

(51) Int. Cl.
*G06K 9/46* (2006.01)
*G01V 1/34* (2006.01)
(Continued)

(52) U.S. Cl.
CPC ........... *G01V 1/345* (2013.01); *G06K 9/4604* (2013.01); *G06K 9/4652* (2013.01);
(Continued)

(58) Field of Classification Search
CPC ..... G01V 1/345; G01V 2210/64; G01V 1/301; G01V 1/307; G01V 2210/641;
(Continued)

(56) References Cited

U.S. PATENT DOCUMENTS 9,202,178 B2 * 12/2015 Hall .................... G06N 3/088
9,424,337 B2 * 8/2016 Hall .................... G06F 16/285
(Continued)

FOREIGN PATENT DOCUMENTS

CN 102831598 A 12/2012
CN 103488971 A 1/2014
(Continued)

OTHER PUBLICATIONS

Chinese Search Report for CN Application No. 201910733457.6, dated Jul. 5, 2019, 9 pages.

*Primary Examiner* — Ali Bayat
(74) *Attorney, Agent, or Firm* — Hoffman Warnick LLC

(57) ABSTRACT

The present disclosure discloses a method for identifying a boundary of a sedimentary facies, a computer device and a computer readable storage medium. The method comprises: acquiring a preliminary marked result of the sedimentary facies in a seismic attribute map; acquiring a color-based K-means classification result of the seismic attribute map by using a maximal between-cluster variance and a K-means clustering; acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

20 Claims, 8 Drawing Sheets

(51) Int. Cl.
  *G06K 9/68*      (2006.01)
  *G06K 9/62*      (2022.01)

(52) U.S. Cl.
  CPC ......... *G06K 9/6218* (2013.01); *G06K 9/6292* (2013.01); *G06K 9/6857* (2013.01); *G01V 2210/64* (2013.01)

(58) Field of Classification Search
  CPC .......... G01V 2210/661; G06K 9/4604; G06K 9/4652; G06K 9/6218; G06K 9/6292; G06K 9/6857; G06K 9/0063; G06K 9/342; G06K 9/6223
  USPC ....................................................... 382/109
  See application file for complete search history.

(56) References Cited

U.S. PATENT DOCUMENTS

| | | | | |
|---|---|---|---|---|
| 10,296,789 | B2* | 5/2019 | Somasundaram | ........................... G06K 9/00456 |
| 11,166,670 | B1* | 11/2021 | Bikhchandani | ........ G16H 50/20 |
| 2008/0285860 | A1* | 11/2008 | Datta | ................... G06K 9/4652 382/224 |
| 2015/0302252 | A1* | 10/2015 | Herrera | .............. G06K 9/00281 382/117 |

FOREIGN PATENT DOCUMENTS

| | | |
|---|---|---|
| CN | 107545577 A | 1/2018 |
| JP | 2006266858 A | 10/2006 |
| JP | 2017142196 A | 8/2017 |

\* cited by examiner

METHOD FOR IDENTIFYING BOUNDARY OF SEDIMENTARY FACIES, COMPUTER DEVICE AND COMPUTER READABLE STORAGE MEDIUM

CROSS-REFERENCE TO RELATED APPLICATIONS

This application claims priority to Chinese Patent Application No. 201910733457.6, filed on Aug. 9, 2019 and entitled "METHOD AND DEVICE FOR IDENTIFYING BOUNDARY OF SEDIMENTARY FACIES", which is incorporated herein by reference in its entirety.

TECHNICAL FIELD

The present disclosure relates to the field of digital image processing technologies, and particularly to a method for identifying a boundary of a sedimentary facies, a computer device and a computer readable storage medium.

BACKGROUND

This section is intended to provide a background or a context for the embodiments of the present disclosure set forth in the claims. Although included in this section, the description here is not admitted as the prior art.

The sedimentary facies is a sum of lithologic characteristics (rock color, material composition, structure, construction, rock type and a combination thereof), paleontological characteristics (species and ecology of organisms) and geochemical characteristics of a current sedimentary environment. The drafting of a sedimentary facies map is an important basic work for the oil and gas exploration and development.

At present, a sedimentary facies map is mainly drafted manually by users relying on artificial means in conjunction with seismic data. A drafter judges a type of the sedimentary facies by virtue of professional knowledge and a geological background, and then manually drafts a facies belt boundary based on a seismic attribute map in conjunction with drilling and logging data. Because a distribution of the sedimentary facies is very complex and different sedimentary facies belts are often interlaced with each other, a manual interpretation of the sedimentary facies boundary based on the seismic attribute map has the problems such as long period, strong subjectivity and great difficulty. Thus, the interpreters prefer to apply an image segmentation algorithm to extract the potential sedimentary information from the seismic data.

The digital image processing technology is a method and technology for removing noise, enhancing, restoring, segmenting and extracting features from an image by a computer. Since the 1950s, many algorithms have been applied to the analysis and processing of the geological images. For example, LeYu adopts an SVM machine learning algorithm, in conjunction with an ASTER image, a DEM model and aeromagnetic data in a horizon identification of a geological remote sensing map, thereby improving the accuracy of identification. Abdul-Qadir et al. adopts a maximum likelihood classification algorithm in the lithologic classification. C. A. Perez et al. adopts an SVM algorithm to extract texture information in the lithology classification. Meanwhile, an interactive lithologic boundary detection algorithm (ILBD algorithm) is discussed in Yathunanthan Vasuki's paper. In this algorithm, the user is required to judge and input an initial horizon sample mark according to his own experience, segment an image by a super-pixel algorithm firstly, and then obtain classified regions from the marked regions based on a region growing method. Although the above algorithms can achieve good effects when being applied to the lithologic classification in the aerial photographs, but cause many problems when being applied to the sedimentary facies belt division based on the seismic attribute map. In the seismic attribute map, the noise is high, there is no obvious boundary between regions, and the image structure is complex, the accuracies of identification and division of the sedimentary facies belts have extremely high requirements on the number and accuracy of the markers. The inaccurate division of the super-pixel block will greatly affect the final effect of division, thereby greatly increasing the workload in the later deposition boundary modification. Although many digital image processing technologies have been applied to the analysis and processing of the geological image, these methods generally focus on the judgement of lithologic boundaries in the aerial photographs, and there is no efficient and accurate processing method for the sedimentary facies distribution map that is more complex.

Thus, the existing method for identifying a boundary of a sedimentary facies have the problems of low efficiency and low accuracy.

SUMMARY OF THE INVENTION

There is provided in the embodiments of the present disclosure a method for identifying a boundary of a sedimentary facies, so as to improve the efficiency and accuracy in the identification of the boundary of sedimentary facies. The method comprises:

acquiring a preliminary marked result of the sedimentary facies in a seismic attribute map;

acquiring a color-based K-means classification result of the seismic attribute map by using a maximal between-cluster variance and a K-means clustering;

acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

There is provided in the embodiments of the present disclosure a computer device, comprising a memory, a processor, and a computer program stored in the memory and executable by the processor, wherein the processor implements the following method when executing the computer program:

acquiring a preliminary marked result of the sedimentary facies in a seismic attribute map;

acquiring a color-based K-means classification result of the seismic attribute map by using a maximal between-cluster variance and a K-means clustering;

acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

There is further provided in the embodiments of the present disclosure a computer-readable storage medium, wherein the computer-readable storage medium stores a computer program for executing the following method:

acquiring a preliminary marked result of the sedimentary facies in a seismic attribute map;

acquiring a color-based K-means classification result of the seismic attribute map by using a maximal between-cluster variance and a K-means clustering;

acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

In the embodiments of the present disclosure, the geological expert only requires to add a few artificial markers on the preliminary marked result. And in the SLIC super-pixel segmentation, a large number of pixels are replaced with a few super-pixels to express the features of the seismic attribute map, and the preliminary marked result and the K-means classification result are taken as constraints at the same time, thereby greatly reducing the number of the artificial markers, and largely improving the efficiency in the identification of the boundary of the sedimentary facies. In addition, the color-based K-means classification result of the seismic attribute map can be obtained by using the maximal between-cluster variance and the K-means clustering, thereby improving the accuracy and efficiency of clustering. Meanwhile, the preliminary marked result from the geological expert is taken as constraints, which can offset the inaccuracy of the data and largely improve the accuracy of the identification of the boundary of the sedimentary facies.

BRIEF DESCRIPTION OF THE DRAWINGS

In order to explain the technical solutions in the embodiments of the present disclosure or in the prior art more clearly, the drawings to be used in the description of the embodiments or of the prior art will be briefly introduced as follows. Apparently, the drawings in the following description merely illustrate some embodiments of the present disclosure, and persons skilled in the art can obtain other drawings from them without paying any creative labor. Herein.

DETAILED DESCRIPTION OF THE EMBODIMENTS

In order that the objective, technical solutions and advantages of the embodiments of the present disclosure are clearer, the embodiments of the present disclosure will be described in further detail as follows with reference to the drawings. Here, the illustrative embodiments of the present disclosure and the description thereof are used to explain the present disclosure rather than limitations thereto.

Figure 1:
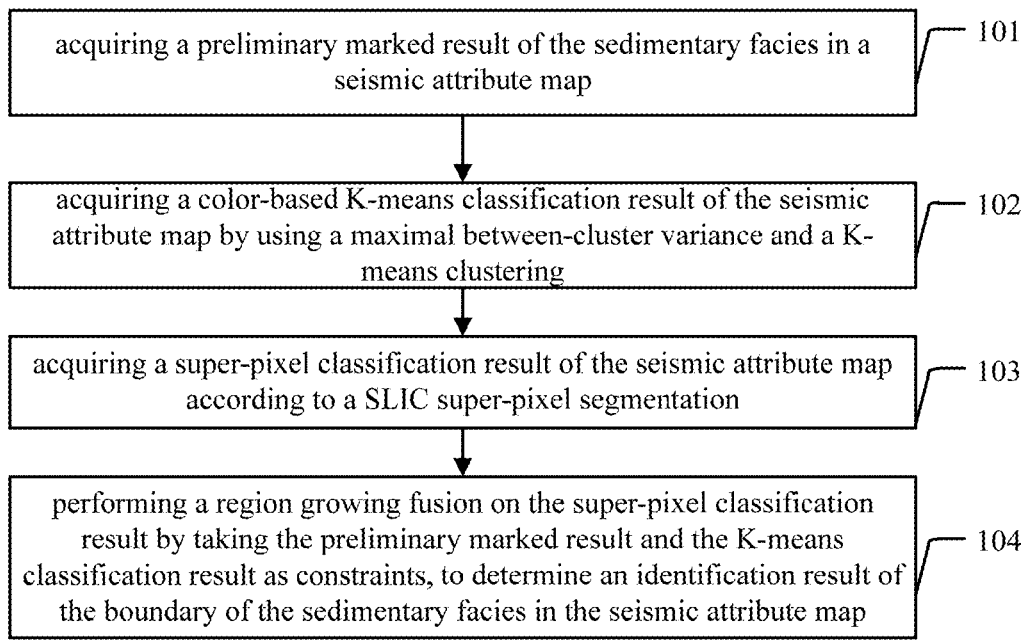
FIG. 1 is a flowchart of an implementation of a method for identifying a boundary of a sedimentary facies provided in an embodiment of the present disclosure.

FIG. 1 shows a flowchart of an implementation of a method for identifying a boundary of a sedimentary facies provided in an embodiment of the present disclosure. For the convenience of explanation, only the parts related to the embodiment of the present disclosure are illustrated, and the details are given as follows.

FIG. 1 shows a method for identifying a boundary of a sedimentary facies, comprising:

step 101: acquiring a preliminary marked result of the sedimentary facies in a seismic attribute map;

step 102: acquiring a color-based K-means classification result of the seismic attribute map by using a maximal between-cluster variance and a K-means clustering;

step 103: acquiring a super-pixel classification result of the seismic attribute map according to a SLIC super-pixel segmentation;

step 104: performing a region growing fusion on the super-pixel classification result by taking the preliminary marked result and the K-means classification result as constraints, to determine an identification result of the boundary of the sedimentary facies in the seismic attribute map.

The sedimentary facies is a sum of generation environments, generation conditions and characteristics of sediments. First of all, a geological expert is required to mark different types of sedimentary facies artificially according to the actual situations and experiences obtained from the actual logging and drilling data, and add artificial markers to distinguish different types of sedimentary facies. For example, the geological expert may adopt discontinuous line segments of any lengths to roughly mark different types of sedimentary facies, and different colors may be used for distinguishing, for example, lines of different colors may represent different types of sedimentary facies. Since the subsequent processing such as the K-means clustering and SLIC super-pixel segmentation can largely reduce the number of the artificial markers input by the geological expert, the geological expert only needs to input a few artificial markers here.

The maximal between-cluster variance is an automatic threshold value calculation method suitable for bimodal cases, also called as an OSTU method, which was proposed by Japanese scholar Otsu in 1979. It divides an image into two parts, i.e., a background and a target according to grayscale characteristics of the image. The greater the between-cluster variance between the background and the target, the greater a difference between the two parts of the image. When some targets are wrongly divided into the background or the background is wrongly divided into the target, the difference between the two parts becomes smaller. Therefore, the segmentation which maximizes the between-cluster variance means a minimum probability of mis-division.

The K-means clustering algorithm is a clustering analysis algorithm for iterative solution. Firstly, a plurality of objects are randomly selected as initial cluster centers, and then each of the objects is assigned to a cluster center closest to the object. The cluster centers are updated until the cluster centers no longer change. At this time, no object is reassigned to different clusters, or a sum of squared errors is locally minimum.

In the embodiment of the present disclosure, the sedimentary facies in the seismic attribute map are automatically classified by using the maximal between-cluster variance, and a classification result is taken as an input of the K-means clustering, i.e., a classification result of the maximal between-cluster variance is taken as an initial cluster center of the K-means clustering to perform the K-means clustering to obtain a color-based K-means classification result, so that the accuracy and efficiency of the K-means clustering can be improved.

The Simple Linear Iterative Clustering (SLIC) super-pixel segmentation is a simple linear superposition clustering. In the embodiment of the present disclosure, it is essentially a process of local clustering of the image pixels in the seismic attribute map. The SLIC super-pixel segmentation can form compact and approximately uniform super-pixels. The SLIC super-pixel segmentation uses the similarities of colors and spatial position features between pixels in the seismic attribute map to group the pixels, and replaces a large number of pixels with a few super-pixels to express the features of the seismic attribute map, thereby reducing the complexity of processing the seismic attribute map to a great extent, and greatly improving the efficiency of the region growing fusion and the efficiency of the identification of the boundary of the sedimentary facies subsequently.

The region growing fusion refers to a process of developing the composed pixels or regions into larger regions. Starting from a set of seed points, a region growth from these points is achieved by fusing adjacent pixels with similar attributes (e.g., intensity, grayscale level, texture color, etc.) to each seed point into this region. In the embodiment of the present disclosure, the method refers to performing a region growing fusion on the super-pixel classification result on the premise of taking the preliminary marked result and the K-means classification result as constraints, and finally determining the identification result of the boundary of the sedimentary facies in the seismic attribute map In the embodiments of the present disclosure, the geological expert only requires to add a few artificial markers on the preliminary marked result. And in the SLIC super-pixel segmentation, a large number of pixels are replaced with a few super-pixels to express the features of the seismic attribute map, and the preliminary marked result and the K-means classification result are taken as constraints at the same time, thereby greatly reducing the number of the artificial markers, and largely improving the efficiency in the identification of the boundary of the sedimentary facies. In addition, the color-based K-means classification result of the seismic attribute map can be obtained by using the maximal between-cluster variance and the K-means clustering, thereby improving the accuracy and efficiency of clustering. Meanwhile, the preliminary marked result from the geological expert is taken as constraints, which can offset the inaccuracy of the data and largely improve the accuracy of the identification of the boundary of the sedimentary facies.

Figure 2:
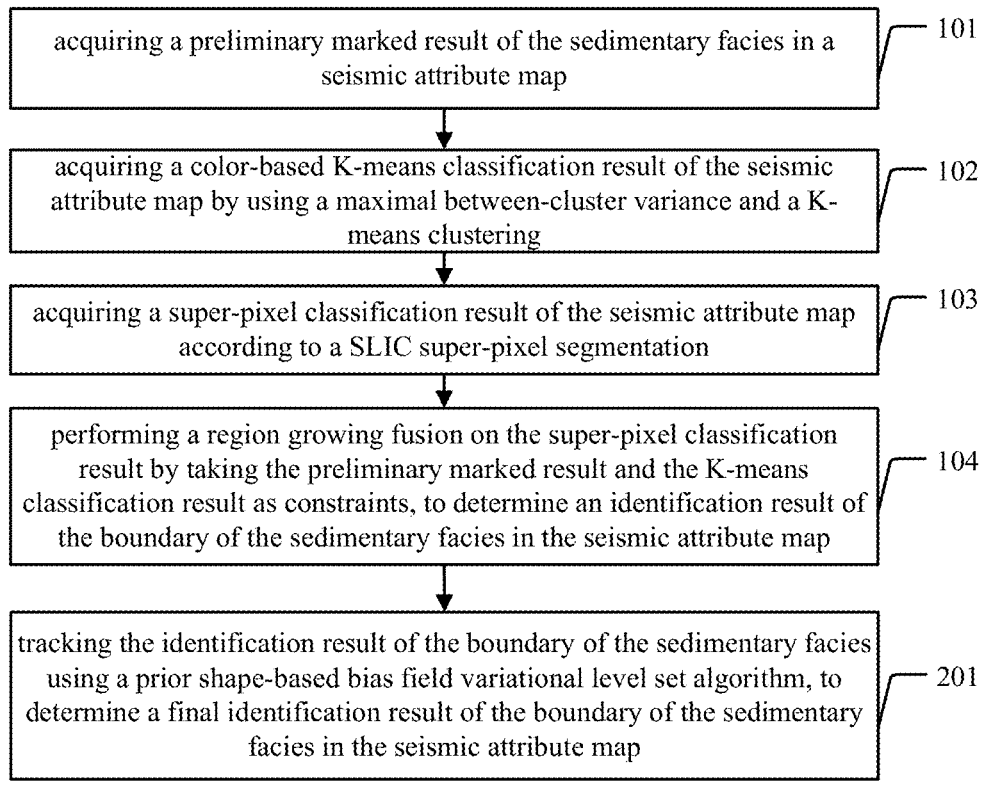
FIG. 2 is a flowchart of another implementation of a method for identifying a boundary of a sedimentary facies provided in an embodiment of the present disclosure.

FIG. 2 shows another flowchart of an implementation of a method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, FIG. 2 shows a method for identifying a boundary of a sedimentary facies, and based on the steps of the method illustrated in FIG. 1, the method illustrated in FIG. 2 further comprises:

step 201: tracking the identification result of the boundary of the sedimentary facies using a prior shape-based bias field variational level set algorithm, to determine a final identification result of the boundary of the sedimentary facies in the seismic attribute map.

Through further researches, the applicant finds that due to the complex structure of the seismic attribute map, the identification result of the boundary of the sedimentary facies obtained after the region growing fusion through the steps of the above method may have the problem of discontinuous region (i.e., there are missed regions). In order to solve this problem, the applicant inventively proposes a prior shape-based bias field variational level set algorithm, and substitutes the preliminary marked result from the geological expert obtained in the steps of the above method into the level set operation process as the prior shape, thereby obtaining the final identification result of the boundary of the sedimentary facies in the seismic attribute map. Through the above steps of the embodiment of the present disclosure, accurate and smooth boundary of the sedimentary facies can be obtained.

The conventional bias field variational level set algorithm sets a slowly changing parameter (i.e., a bias field) to indicate a portion with non-uniform grayscales in the image, which satisfies a particular relationship between an original image with non-uniform grayscales and an ideal image with uniform grayscale. In order to compensate for the missed region, the embodiment of the present disclosure introduces a prior shape into a global energy function of the conventional bias field variational level set algorithm to improve the accuracy of the segmentation. Herein, the prior shape needs to be manually added by the geological expert, and represents a missed region considered to be filled by the geological expert.

In the embodiment of the present disclosure, the identification result of the boundary of the sedimentary facies is tracked by using the prior shape-based bias field variational level set algorithm, the final identification result of the boundary of the sedimentary facies in the seismic attribute map is determined, and the prior shape is substituted into the level set operation process, so as to compensate for the missed region and obtain accurate and smooth boundary of the sedimentary facies.

Figure 3:
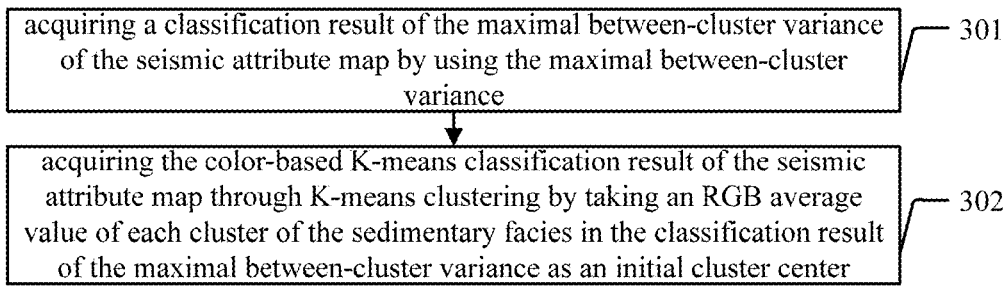
FIG. 3 is a flowchart of an implementation of step 102 in a method for identifying a boundary of a sedimentary facies provided in an embodiment of the present disclosure.

FIG. 3 shows an implementation flowchart of step 102 in the method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as illustrated in FIG. 3, step 102, i.e., acquiring a color-based K-means classification result of the seismic attribute map by using a maximal between-cluster variance and a K-means clustering comprises:

step 301: acquiring a classification result of the maximal between-cluster variance of the seismic attribute map by using the maximal between-cluster variance;

step 302: acquiring the color-based K-means classification result of the seismic attribute map through K-means clustering by taking an RGB average value of each cluster of the sedimentary facies in the classification result of the maximal between-cluster variance as an initial cluster center.

When the color-based K-means classification result of the seismic attribute map is obtained, firstly, the classification result of the maximal between-cluster variance of the seismic attribute map is obtained by using the maximal between-cluster variance method, and then the classification result of the maximal between-cluster variance is taken as an input of the K-means clustering, i.e., a RGB average value of each cluster of the sedimentary facies in the classification result of the maximal between-cluster variance is taken as the initial cluster center of the K-means clustering, to perform the color-based K-means clustering on the seismic attribute map, so as to obtain the color-based K-means classification result.

In the embodiment of the present disclosure, the classification result of the maximal between-cluster variance of the seismic attribute map is firstly obtained by using the maximal between-cluster variance, then the RGB average value of each cluster of the sedimentary facies in the classification result of the maximal between-cluster variance is taken as the initial cluster center, and the color-based K-means classification result of the seismic attribute map is obtained through the K-means clustering, thereby improving the classification accuracy and classification efficiency.

In an embodiment of the present disclosure, as shown in FIG. 3, step 301, i.e., acquiring a classification result of the maximal between-cluster variance of the seismic attribute map by using the maximal between-cluster variance comprises the steps of:

performing a grayscale processing on the seismic attribute map to obtain a seismic attribute grayscale map;

determining a proportion and an average grayscale of pixels having grayscale values not less than an initial pixel threshold value, and a proportion and an average grayscale of pixels having grayscale values less than the initial pixel threshold value, in the seismic attribute grayscale map, respectively;

determining a between-cluster variance according to the proportion and the average grayscale of the pixels having the grayscale values not less than the initial pixel threshold value, the proportion and the average grayscale of the pixels having the grayscale values less than the initial pixel threshold value, and a total average grayscale of the seismic attribute grayscale map;

determining, in a preset grayscale interval, a grayscale value which maximizes the between-cluster variance of the seismic attribute grayscale map, and updating a grayscale interval and a cluster number of the between-cluster variance;

if the updated number of clusters of the between-cluster variance is less than a preset number of clusters of the between-cluster variance, repeating above steps, continuing to determine, in the updated grayscale interval, a grayscale value which maximizes the between-cluster variance corresponding to the updated grayscale interval, and continuing to update the grayscale interval and the number of clusters of the between-cluster variance; and acquiring the classification result of the maximal between-cluster variance, until the updated number of clusters of the between-cluster variance is equal to the preset number of clusters of the between-cluster variance.

In the embodiment of the present disclosure, a component method, a maximum value method, an average value method and a weighted average method may be adopted to perform a grayscale processing on the image. The grayscale image is a special color image having RGB components the same as each other, wherein a variation range of a pixel is 255 types, and a color depth of a point in the black-and-white image is generally from 0 to 255 (255 for white, and 0 for black). The so-called grayscale value refers to a chroma of the color. The seismic attribute grayscale map is obtained after the grayscale processing is performed on the seismic attribute map.

Herein, the initial pixel threshold value is a pixel threshold value set in advance. Assuming that the initial pixel threshold value is denoted by T, the initial pixel threshold value T may be set to 0 in advance when the maximal between-cluster variance classification is performed for the first time. The between-cluster variance specifically may be determined through the following formula:

$$g=\omega_0(\mu_0-\mu)^2+\omega_1(\mu_1-\mu)^2;$$

Herein, g denotes a between-cluster variance, $\omega_0$ denotes a proportion of pixels having grayscale values not less than an initial pixel threshold value in the seismic attribute grayscale map, $\mu_0$ denotes an average grayscale of the pixels having the grayscale values not less than the initial pixel threshold value in the seismic attribute grayscale map, $\omega_1$ denotes a proportion of pixels having grayscale values less than the initial pixel threshold value in the seismic attribute grayscale map, $\mu_1$ denotes an average grayscale of the pixels having the grayscale values less than the initial pixel threshold value in the seismic attribute grayscale map, and $\mu$ denotes a total average grayscale of the seismic attribute grayscale image.

Herein, the preset grayscale interval [0, T] may be set to [0, 255] in advance, the number of clusters of the between-cluster variance is related to the number of the pixel threshold values, and when the grayscale interval and the between-cluster variance classification are updated, there are at least two cases as follows.

In a case that the initial pixel threshold value T is 0 or 255, since the preset grayscale interval is [0, 255], it means that the grayscale values are not classified, and the number of the initial pixel threshold values (or the iteration number of the maximum between-cluster variance) is 0, then the number of clusters of the between-cluster variance is 0+1=1.

After the expression of the between-cluster variance g is determined, a grayscale value T0, i.e., an updated pixel threshold value for classification, which maximizes the between-cluster variance g is determined in the grayscale interval [0, 255]. At this time, the pixel threshold value is T0, the number of the pixel threshold values (or the iteration number of maximum between-cluster variance) is updated from 0 to 1, the grayscale interval [0, 255] is updated to two grayscale intervals, i.e., [0, T0] and [T0, 255], and the updated number of clusters of the between-cluster variance is 1+1=2. At this time, it is judged whether the updated number of clusters of the between-cluster variance of 2 is equal to a preset number of clusters of the between-cluster variance that is set in advance. If the updated number of clusters of the between-cluster variance of 2 is less than the preset number of clusters of the between-cluster variance, the above steps of the between-cluster variance classification are repeated, and continued in the grayscale interval with a larger proportion of pixels. Assuming that a proportion of pixels in the grayscale interval [0, T0] is larger than a proportion of pixels in the grayscale interval [T0, 255], the between-cluster variance classification is continued in the grayscale interval [0, T0] to determine a grayscale value T1 which maximizes the between-cluster variance of the grayscale interval [0, T0]. At this time, the pixel threshold value of the grayscale interval [0, T0] is T1, the number of the pixel threshold values (or the iteration number of maximum between-cluster variance) is updated from 1 to 2, the grayscale interval [0, T0] is updated to the grayscale intervals [0, T1] and [T1, T0], and the number of the grayscale intervals is updated from 2 to 2+1=3. That is, the number of clusters of the between-cluster variance is updated from 2 to 2+1=3.

It is continued to judge whether the updated number of clusters of the between-cluster variance is equal to the preset number of clusters of the between-cluster variance that is set in advance. If the updated number of clusters of the between-cluster variance is equal to the preset number of clusters of the between-cluster variance that is set in advance, the classification process is terminated to obtain a classification result of the maximal between-cluster variance.

If the updated number of clusters of the between-cluster variance is less than the preset number of clusters of the between-cluster variance that is set in advance, the between-cluster variance classification is continued in a grayscale interval with a larger proportion of pixels among the grayscale intervals [0, T1] and [T1, T0]. Assuming that the proportion of pixels in the grayscale interval [0, T1] is less than the proportion of pixels in the grayscale interval [T1, T0], the between-cluster variance classification is continued in the grayscale interval [T1, T0], and a pixel threshold value T2 which maximizes the between-cluster variance of the grayscale interval [T1, T0] is determined, so as to continue to update the grayscale interval and the number of clusters of the between-cluster variance. The classification process is terminated when the updated number of clusters of the between-cluster variance is equal to the preset number of clusters of the between-cluster variance that is set in advance to obtain a classification result of the maximal between-cluster variance, in which the sedimentary facies in the seismic attribute map are classified into a plurality of sedimentary facies that are most diverse.

Therefore, in the embodiment of the present disclosure, assuming that the number of the pixel threshold values (or the iteration number of maximum between-cluster variance) is X and the corresponding number of clusters of the between-cluster variance is Y, X and Y satisfy: Y=X+1.

Persons skilled in the art can understand that the number of clusters of the between-cluster variance can be set in advance according to the actual conditions and the specific requirements. For example, the preset number of clusters of the between-cluster variance is set to 2 or 4 in advance. Persons skilled in the art can understand that the preset number of clusters of the between-cluster variance may also be set to a value other than 2 and 4 in advance, such as 3, 6 or 9, which is not limited in the embodiment of the present disclosure.

(2) In a case that the initial pixel threshold value T is 0 or 255, since the preset grayscale interval is [0, 255], it means that the grayscale values are not classified, and the number of the initial pixel threshold values (or the iteration number of maximum between-cluster variance) is 0, then the number of clusters of the between-cluster variance is $2^0=1$.

After the expression of the between-cluster variance g is determined, a grayscale value T0, i.e., the updated pixel threshold value for classification, which maximizes the between-cluster variance g is determined in the grayscale interval [0, 255]. At this time, the pixel threshold value is T0, the number of the pixel threshold values (or the iteration number of maximum between-cluster variance) is updated from 0 to 1, the grayscale interval [0, 255] is updated to two grayscale intervals, i.e., [0, T0] and [T0, 255], and the updated number of clusters of the between-cluster variance is $2^1=2$. At this time, it is judged whether the updated number of clusters of the between-cluster variance of 2 is equal to the preset number of clusters of the between-cluster variance that is set in advance. If the updated number of clusters of the between-cluster variance of 2 is less than the preset number of clusters of the between-cluster variance, the steps of between-cluster variance classification are repeated, and continued in the grayscale intervals [0, T0] and [T0, 255]. The pixel threshold value T1 which maximizes the between-cluster variance corresponding to the grayscale interval [0, T0], and the pixel threshold value T2 which maximizes the between-cluster variance corresponding to the grayscale interval [T0, 255] are determined respectively. At this time, the pixel threshold values are T1 and T2, the number of the pixel threshold values is updated from 1 (T0) to 2 (T1 and T2), and the number of the grayscale intervals are updated from 2, i.e., the grayscale intervals [0, T0] and [T0, 255], to $2^2=4$, i.e., the grayscale intervals [0, T1], [T1, T0], [T0, T2] and [T2, 255].

It is continued to judge whether the updated number of clusters of the between-cluster variance is equal to the preset number of clusters of the between-cluster variance that is set in advance. If the updated number of clusters of the between-cluster variance is equal to the preset number of clusters of the between-cluster variance that is set in advance, the classification process is terminated to obtain a classification result of the maximal between-cluster variance.

If the updated number of clusters of the between-cluster variance is less than the preset number of clusters of the between-cluster variance that is set in advance, the between-cluster variance classification is continued in the grayscale intervals [0, T1], [T1, T0], [T0, T2] and [T2, 255], and the grayscale intervals and the number of clusters of the between-cluster variance are continued to be updated. The classification process is terminated when the updated number of clusters of the between-cluster variance is equal to the preset number of clusters of the between-cluster variance that is set in advance, so as to obtain a classification result of the maximal between-cluster variance, in which the sedimentary facies in the seismic attribute map are classified into a plurality of sedimentary facies that are most diverse.

Therefore, in the embodiment of the present disclosure, assuming that the number of the pixel threshold values (or the iteration number of maximum between-cluster variance) is X and the corresponding number of clusters of the between-cluster variance is Y, X and Y satisfy: Y=2X.

Persons skilled in the art can understand that the number of clusters of the between-cluster variance can be set in advance according to the actual conditions and the specific requirements. For example, the preset number of clusters of the between-cluster variance is set to 2 or 4 in advance. Persons skilled in the art can understand that the preset number of clusters of the between-cluster variance may also be set to a value other than 2 and 4 in advance, such as 8 or 16 (i.e., 2×), which is not limited in the embodiment of the present disclosure.

In an embodiment of the present disclosure, the seismic attribute map may be divided, through the maximal between-cluster variance classification, into two types that are most diverse: the channel sedimentary facies and the non-channel sedimentary facies.

In the embodiment of the present disclosure, the between-cluster variance is continuously updated to obtain the classification result of the maximal between-cluster variance, which further improves not only the accuracy of the classification result, but also the classification efficiency.

Figure 4:
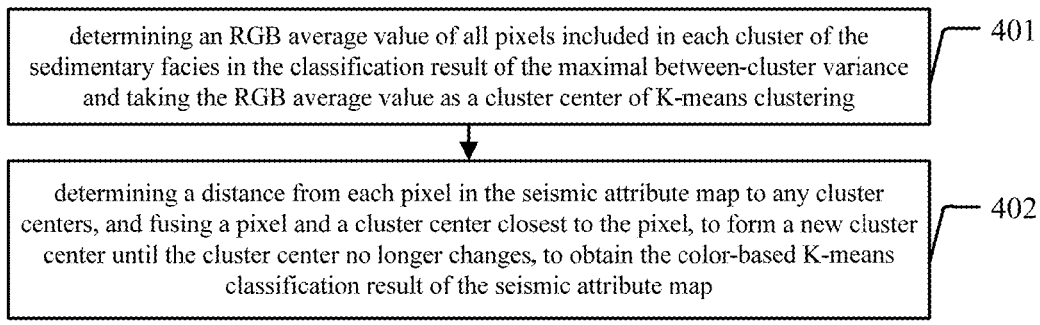
FIG. 4 is a flowchart of an implementation of step 302 in a method for identifying a boundary of a sedimentary facies provided in an embodiment of the present disclosure.

FIG. 4 shows a flowchart of an implementation of step 302 in a method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 4, step 302, i.e., acquiring the color-based K-means classification result of the seismic attribute map through K-means clustering by taking an RGB average value of each cluster of the sedimentary facies in the classification result of the maximal between-cluster variance as an initial cluster center comprises:

step 401: determining an RGB average value of all pixels included in each cluster of the sedimentary facies in the classification result of the maximal between-cluster variance and taking the RGB average value as a cluster center of K-means clustering; and step 402: determining a distance from each pixel in the seismic attribute map to any cluster centers, and fusing a pixel and a cluster center closest to the pixel, to form a new cluster center until the cluster center no longer changes, to obtain the color-based K-means classification result of the seismic attribute map.

When the K-means clustering is performed, the classification result of the maximal between-cluster variance is taken as the input of the K-means clustering, i.e., the RGB average value of each cluster of the sedimentary facies in the classification result of the maximal between-cluster variance is taken as the initial cluster center of the K-means clustering, then the distance from each pixel in the seismic attribute map to any initial cluster center is determined, and the each pixel is fused with an initial cluster center closest to each pixel to form a new cluster center, thereby updating the cluster center. The above operation is performed on all the pixels until the final cluster center no longer changes, thereby obtaining the color-based K-means classification result of the seismic attribute map.

In the embodiment of the present disclosure, the sedimentary facies in the seismic attribute map are classified through the K-means clustering based on the maximal between-cluster variance, thereby further improving the accuracy of the classification result of the sedimentary facies.

Figure 5:
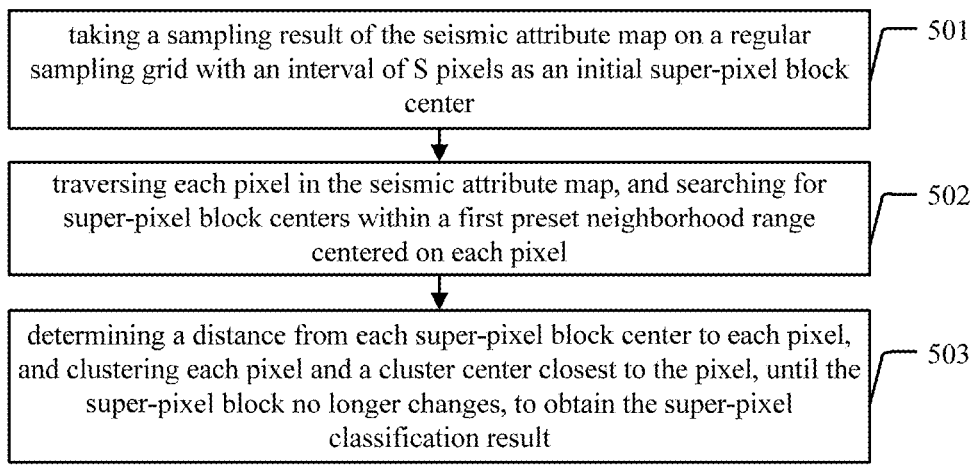
FIG. 5 is a flowchart of an implementation of step 103 in a method for identifying a boundary of a sedimentary facies provided in an embodiment of the present disclosure.

FIG. 5 shows a flowchart of an implementation of step 103 in the method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 5, step 103, i.e., acquiring a super-pixel classification result of the seismic attribute map according to a SLIC super-pixel segmentation comprises:

step 501: taking a sampling result of the seismic attribute map on a regular sampling grid with an interval of S pixels as an initial super-pixel block center;

step 502: traversing each pixel in the seismic attribute map, and searching for super-pixel block centers within a first preset neighborhood range centered on each pixel;

step 503: determining a distance from each super-pixel block center to each pixel, and clustering each pixel and a cluster center closest to the pixel, until the super-pixel block no longer changes, to obtain the super-pixel classification result.

When an SLIC super-pixel segmentation is performed on the seismic attribute map, the seismic attribute map is sampled by using a regular sampling grid, and a sampling result is taken as an initial super-pixel block center. Herein, the regular sampling grid is a sampling grid with an interval of S pixels, i.e., a step size for dividing the super-pixel block is S. In an embodiment of the present disclosure, the step size S for dividing is 25, i.e., the super-pixels are divided every 25 pixels in the seismic attribute map.

Herein, a first preset neighborhood range is a neighborhood range set in advance, and persons skilled in the art can understand that the preset neighborhood range can be set according to the actual conditions and the specific requirements. For example, in an embodiment of the present disclosure, the preset neighborhood range is set to 2S×2S in advance. Persons skilled in the art can also set the preset neighborhood range to be any neighborhood range other than 2S×2S in advance, which is not limited in the embodiment of the present disclosure.

After the sampling result is taken as the initial super-pixel block center, all the pixels in the seismic attribute map are traversed, and all super-pixel blocks within the 2S×2S neighborhood range centered on said pixel are searched, the distance from the each pixel to each super-pixel block center within the 2S×2S neighborhood range is determined, and the each pixel and the super-pixel block closest to said each pixel are fused and clustered into a new super-pixel block, so as to update the super-pixel block. The above operation is performed on all the pixels in the seismic attribute map until the super-pixel block no longer changes, thereby obtaining the super-pixel classification result.

In an embodiment of the present disclosure, the distance from the pixel to the super-pixel block center of the seismic attribute map can be determined by the following formulas:

$$D=\sqrt{d_c^2+m^2d_s^2};$$

$$d_c=\sqrt{(l_j-l_i)^2+(a_j-a_i)^2+(b_j-b_i)^2};$$

$$d_s=\sqrt{(x_j-x_i)^2+(y_j-y_i)^2};$$

Herein, D denotes a distance from a pixel to a super-pixel block center of the seismic attribute map, $d_c$ denotes a color similarity between the pixel and the super-pixel block center of the seismic attribute map, m denotes an importance parameter weighing the color similarity and a spatial similarity, $d_s$ denotes a spatial similarity between the pixel and the super-pixel block center, $l_j$ denotes a brightness of pixel j, $l_i$ denotes a brightness of the super-pixel block center, $a_j$ denotes a value of color channel a of the pixel j, $a_i$ denotes a value of color channel a of the super-pixel block center, $b_j$ denotes a value of color channel b of the pixel j, $b_i$ denotes a value of color channel b of the super-pixel block, $x_j$ denotes a transversal coordinate of the pixel j, $x_i$ denotes a transversal coordinate of the super-pixel block center, $y_j$ denotes a vertical coordinate of the pixel j, and $y_i$ denotes a vertical coordinate of the super-pixel block center.

Herein, m denotes an importance parameter weighing a color similarity and a spatial similarity. As the value of m increases, the proportion of the spatial similarity increases in the super-pixel block distance measurement, and the generated super-pixel block is closer to a rectangle. As the value of m decreases, the proportion of the color similarity increases in the super-pixel block distance measurement; at this time, the color similarity is more important, i.e., the generated super-pixel block is more tightly attached to the initial boundary of the image. In an embodiment of the present disclosure, m generally takes a value in a range [1, 40]. Persons skilled in the art can understand that the value of m can be set in advance according to the actual conditions and the specific requirements. In the embodiment of the present disclosure, for example, the value of m is set to 10 in advance, and persons skilled in the art can understand that m may also be set to a value other than 10, which is not particularly limited in the embodiment of the present disclosure.

In the embodiment of the present disclosure, the super-pixel blocks are continuously updated to further obtain the super-pixel classification result, and the large number of pixels are replaced with a few super-pixel blocks by utilizing the similarities of colors and spatial position features between the pixels, to express the features of the seismic attribute map, thereby greatly reducing the complexity after the image processing, and greatly improving the efficiency of identification of the sedimentary facies.

In an embodiment of the present disclosure, before step 501 of the method illustrated in FIG. 5, step 103, i.e., acquiring a super-pixel classification result of the seismic attribute map according to a SLIC super-pixel segmentation further comprises:

converting the seismic attribute map from an RGB color space to a LAB color space;

correspondingly, step 501, i.e., taking a sampling result of the seismic attribute map on a regular sampling grid with an interval of S pixels as an initial super-pixel block center comprises:

taking a sampling result of the seismic attribute map converted into the LAB color space on a regular sampling grid with an interval of S pixels as an initial super-pixel block center.

Since the LAB color space is closer to the human visual perception, the SLIC super-pixel segmentation of the seismic attribute map is performed in the LAB color space, which can improve the effect of SLIC super-pixel segmentation.

In the embodiment of the present disclosure, the seismic attribute map is converted from the RGB color space to the LAB color space, and the SLIC super-pixel segmentation is performed on the seismic attribute map which is converted into the LAB color space, thereby improving the SLIC super-pixel segmentation effect.

In an embodiment of the present disclosure, after step 501 of the method illustrated in FIG. 5, step 103, i.e., acquiring a super-pixel classification result of the seismic attribute map according to a SLIC super-pixel segmentation further comprises:

adjusting the initial super-pixel block center to a position with a lowest gradient within a second preset neighborhood range, to obtain an adjusted super-pixel block center;

correspondingly, step 502, i.e., traversing each pixel in the seismic attribute map, and searching for super-pixel block centers within a first preset neighborhood range centered on each pixel comprises:

traversing each pixel in the seismic attribute map, and searching for adjusted super-pixel block centers in the second preset neighborhood range.

In the embodiment of the present disclosure, the second preset neighborhood range is a neighborhood range set in advance, and persons skilled in the art can understand that the second preset neighborhood range can be set in advance according to the actual conditions and the specific requirements. In an embodiment of the present disclosure, the second preset neighborhood range may be set in advance to a 3×3 neighborhood range, or any other neighborhood range, which is not particularly limited in the embodiment of the present disclosure.

In the embodiment of the present disclosure, the initial super-pixel block center is adjusted to the position with the lowest gradient within the second preset neighborhood range, which can effectively prevent the initial super-pixel block center from being located on the boundary or the noise point.

Figure 6:
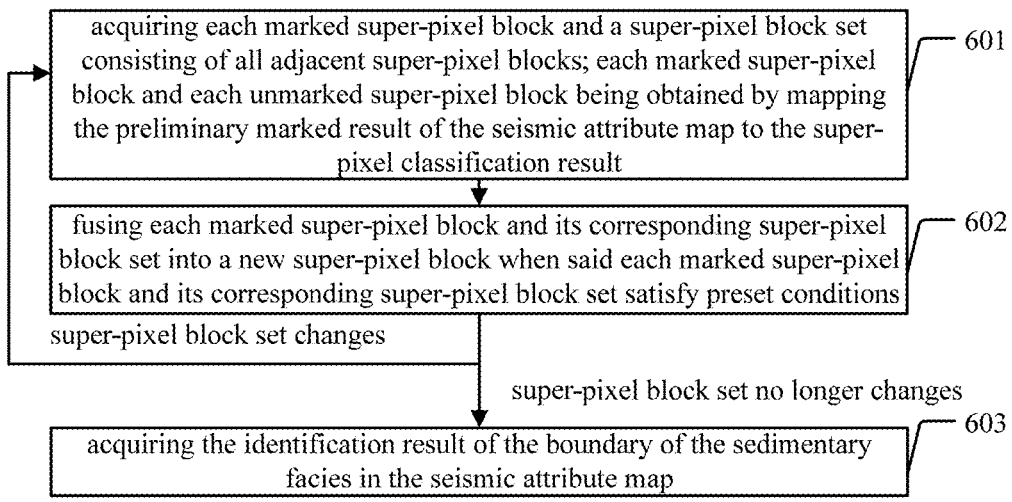
FIG. 6 is a flowchart of an implementation of step 104 in a method for identifying a boundary of a sedimentary facies provided in an embodiment of the present disclosure.

FIG. 6 shows a flowchart of an implementation of step 104 in a method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 6, step 104, i.e., performing a region growing fusion on the super-pixel classification result by taking the preliminary marked result and the K-means classification result as constraints, to determine an identification result of the boundary of the sedimentary facies in the seismic attribute map comprises:

step 601: acquiring each marked super-pixel block and a super-pixel block set consisting of all adjacent super-pixel blocks; each marked super-pixel block and each unmarked super-pixel block being obtained by mapping the preliminary marked result of the seismic attribute map to the super-pixel classification result;

step 602: fusing each marked super-pixel block and its corresponding super-pixel block set into a new super-pixel block when said each marked super-pixel block and its corresponding super-pixel block set satisfy preset conditions;

Steps 601 to 602 are repeated until the super-pixel block set no longer changes, and then step 603 is performed: obtaining the identification result of the boundary of the sedimentary facies in the seismic attribute map.

In the embodiment of the present disclosure, the marked and unmarked super-pixel blocks can be obtained by mapping the preliminary marked result of the seismic attribute map to the super-pixel classification result. Furthermore, each marked super-pixel block and the super-pixel block set consisting of all adjacent super-pixel blocks of the marked super-pixel block are determined respectively. In a case where the marked super-pixel block and the corresponding super-pixel block set satisfy preset conditions, they are fused to form a new super-pixel block, thereby updating the super-pixel block. The updating process is repeated until the super-pixel block no longer changes. The above process is to perform a region growing fusion on the super-pixel classification result, and finally obtain the identification result of the boundary of the sedimentary facies in the seismic attribute map.

In the embodiment of the present disclosure, the super-pixel blocks are continuously updated through a region growing fusion, and the features of the seismic attribute map are expressed through a few super-pixel blocks, so that the efficiency of identification of the sedimentary facies can be greatly improved.

In an embodiment of the present disclosure, the preset conditions comprise:

super-pixel blocks included in a super-pixel block set corresponding to each marked super-pixel block are all unmarked super-pixel blocks; and a color type of each marked super-pixel block is the same as a color type of a center point of the super-pixel block set in the K-means classification result; and a distance from a center point of each marked super-pixel block to the center point of the corresponding super-pixel block set is not more than a preset distance threshold value.

In the embodiment of the present disclosure, when a marked super-pixel block and its corresponding super-pixel block set are fused, the following conditions should be satisfied, firstly, the super-pixel blocks included in the super-pixel block set corresponding to the marked super-pixel block are all unmarked super-pixel blocks; secondly, the color type of the marked super-pixel block is the same as the color type of the center point of the super-pixel block set in the K-means classification result; and finally, the distance from the center point of the marked super-pixel block to the center point of the corresponding super-pixel block set is not more than a preset distance threshold value. Herein, the preset distance threshold value is set in advance, and persons skilled in the art can understand that the preset distance threshold value may be set in advance according to the actual conditions and the specific requirements, which is not particularly limited in the embodiment of the present disclosure. Only when the above three conditions are satisfied at the same time, will the marked super-pixel block undergo a region growing fusion with the corresponding super-pixel block set, and be updated to a new super-pixel block.

In an embodiment of the present disclosure, the distance from the center point of the marked super-pixel block and the center point of the corresponding super-pixel block set may be determined by the following formula:

$$d=\sqrt{(l_1-l_2)^2+(a_1-a_2)^2+(b_1-b_2)^2};$$

Herein, d denotes a distance from the center point of the marked super-pixel block of the seismic attribute map to the center point of the corresponding super-pixel block set of the seismic attribute map, $l_1$ denotes a brightness value of the center point of the marked super-pixel block of the seismic attribute map, $l_2$ denotes a brightness value of the center point of the corresponding super-pixel block set of the seismic attribute map, $a_1$ denotes a value of color channel a of the center point of the marked super-pixel block of the seismic attribute map, $a_2$ denotes a brightness value of the center point of the corresponding super-pixel block set of the seismic attribute map, $b_1$ denotes a value of color channel b of the center point of the marked super-pixel block of the seismic attribute map, and $b_2$ denotes a brightness value of the center point of the corresponding super-pixel block set of the seismic attribute map.

Figure 7:
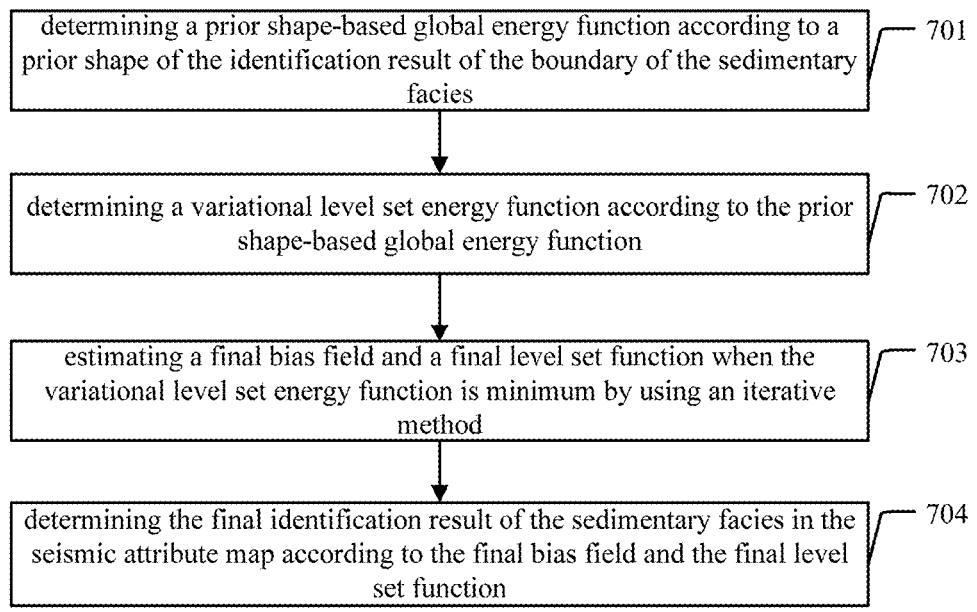
FIG. 7 is a flowchart of an implementation of step 201 in a method for identifying a boundary of a sedimentary facies provided in an embodiment of the present disclosure.

FIG. 7 shows a flowchart of an implementation of step 201 in the method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 7, step 201, i.e., tracking the identification result of boundary of the sedimentary facies using a prior shape-based bias field variational level set algorithm, to determine a final identification result of the boundary of the sedimentary facies in the seismic attribute map comprises:

step 701: determining a prior shape-based global energy function according to a prior shape of the identification result of the boundary of the sedimentary facies;

step 702: determining a variational level set energy function according to the prior shape-based global energy function;

step 703: estimating a final bias field and a final level set function when the variational level set energy function is minimum by using an iterative method;

step 704: determining the final identification result of the sedimentary facies in the seismic attribute map according to the final bias field and the final level set function.

In order to compensate for the missed region in the identification result of the boundary of the sedimentary facies, the present disclosure introduces a prior shape into a global energy function of the conventional bias field variational level set algorithm to improve the segmentation accuracy. Herein, the prior shape is manually added by the geological expert and represents the missed region considered to be filled by the geological expert. Assuming that the prior shape is represented by $\psi$, how to represent the prior shape $\psi$ using a symbolic distance function will be described in detail later, which is omitted here. Therefore, the global energy function in the embodiment of the present disclosure is all of the prior shape-based energy functions, which may be denoted with E here.

Assuming that the variational level set energy function is denoted with F, the prior shape-based global energy function E is determined and then introduced into the variational level set energy function as a data driver to obtain:

$$F=E+vL(\phi)+\mu R(\phi);$$

Herein, F denotes a variational level set energy function, E denotes a prior shape-based global energy function, $\phi$ denotes a level set function, $L(\phi)$ denotes a contour length of the level set function of the seismic attribute map at a zero horizontal plane to smooth an evolutionary trend contour, v denotes a weight parameter of the contour length of the level set function of the seismic attribute map at a zero horizontal plane, R(ϕ) denotes a distance regular term, and μ denotes a weight parameter of the distance regular term.

After the expression of the variational level set energy function F is determined, the evolutionary trend contour is continuously updated by the iterative method (assuming that the evolutionary trend contour is denoted by $c_0$) to determine the bias field b and the level set function ϕ when the variational level set energy function F achieves a minimum value, as a final bias field and a final level set function, thereby determining a final identification result of the sedimentary facies in the seismic attribute map according to the final bias field and the final level set function.

In the embodiment of the present disclosure, the prior shape-based global energy function is determined firstly, and then the variational level set function is determined. Next, the final bias field and the final level set function are estimated by using an iterative method, so as to obtain the final identification result of the sedimentary facies in the seismic attribute map. The embodiment of the present disclosure introduces a prior shape into the conventional bias field variational level set algorithm, and fills the missed part in the seismic attribute map, thus the identified boundary of the sedimentary facies are smoother, thereby further improving the identification result of the sedimentary facies in the seismic attribute map.

Figure 8:
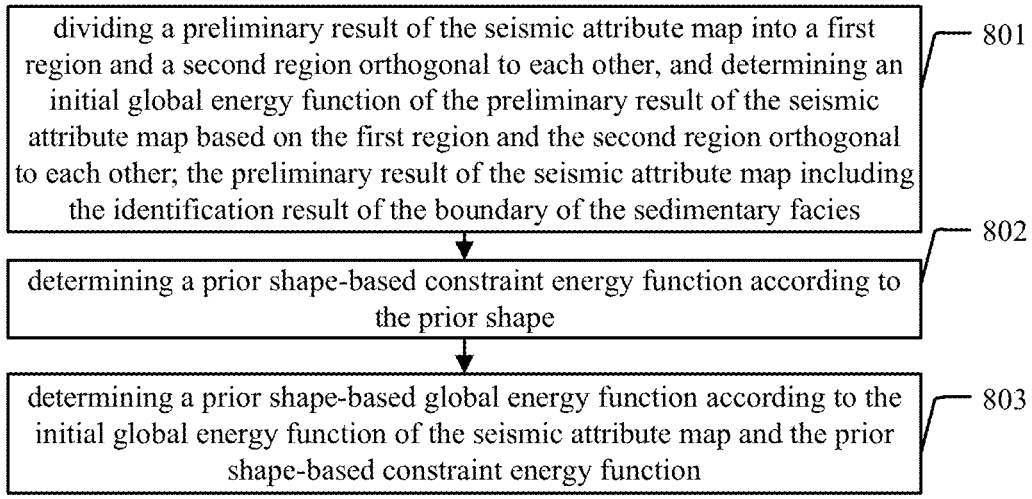
FIG. 8 is a flowchart of an implementation of step 701 in a method for identifying a boundary of a sedimentary facies provided in an embodiment of the present disclosure.

FIG. 8 shows a flowchart of an implementation of step 701 in the method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 8, step 701, i.e., determining a prior shape-based global energy function according to a prior shape of the identification result of the boundary of the sedimentary facies comprises:

step 801: dividing a preliminary result of the seismic attribute map into a first region and a second region orthogonal to each other, and determining an initial global energy function of the preliminary result of the seismic attribute map based on the first region and the second region orthogonal to each other; the preliminary result of the seismic attribute map including the identification result of the boundary of the sedimentary facies;

step 802: determining a prior shape-based constraint energy function according to the prior shape;

step 803: determining a prior shape-based global energy function according to the initial global energy function of the seismic attribute map and the prior shape-based constraint energy function.

The conventional bias field variational level set algorithm sets a slowly changing parameter b (i.e., a bias field) to represent a portion with non-uniform grayscale in the image, I represents the observed image (original image), J represents the ideal image with uniform grayscale, and the relationship between the three is shown in formula (5-5):

$$I = b \cdot J;$$

In the division of the seismic attribute map in the embodiment of the present disclosure, b may represent a portion with non-uniform grayscale in the seismic attribute map, I may represent an original seismic attribute map with non-uniform grayscale, and J may represent an ideal seismic attribute map with uniform grayscale (i.e., an ideal image), and b is a slowly changing parameter, i.e., the following assumptions are made for the bias field b and the ideal image J of the seismic attribute map:

the bias field b on the seismic attribute map changes slowly, which means that within a certain region, the bias field b may be considered as a constant, for the convenience of the subsequent calculation;

the ideal image J of the seismic attribute map can be divided into n regions orthogonal to each other, and each region can approximately use a constant $c_1, c_2, \ldots c_{n-1}, c_n$ to represent the grayscale value of each region.

According to the above assumptions (1) and (2) and formula $I = b \cdot J$, useful information on local features of seismic attribute maps can be obtained. Considering a circular neighborhood $O_y$ having a radius ρ and a circle center y∈Ω in the seismic attribute map, wherein Ω is the entire seismic attribute map and defined as $O_y \triangleq \{x:|x-y| \le \rho\}$, wherein x is any point in the circular neighborhood $O_y$, and y is the circle center of the neighborhood $O_y$. Assuming that the bias field b changes slowly within the circular region $O_y$, then the bias field b(y) in the region $O_y$ is similar to the bias field b(x) at the circle center, i.e., b(x)≈b(y), x∈$O_y$. Thus, in each orthogonal region, a product of the bias field b(x) and a grayscale value J(x) of the ideal image J is approximately equal to a constant b(y)$c_i$, $c_i = c_1, c_2, \ldots c_{n-1}, c_n$, i.e., b(x)J(x)≈b(y)$c_i$, x∈$O_y$.

Therefore, in the region $O_y \cap \Omega_i$, $\Omega_i = \Omega_1, \Omega_2, \ldots, \Omega_{n-1}, \Omega_n$, the circular neighborhood $O_y$ may be effectively classified into n types centered at $m_i = b(x)c_i$, i=1, 2, ... n−1, n, so that the grayscale information of the seismic attribute map is incorporated into the level set algorithm, and the seismic attribute map is divided into n parts, each having local energy defined below:

$$E_y = \sum_{i=1}^{n} \int_{\Omega_i \cap O_y} K(y-x)|I(x) - b(y)c_i|^2 dx;$$

Herein, K(y−x) indicates a non-negative window function, i.e., a circular region, which represents a local region in the seismic attribute map, and K(y−x)=0 is satisfied in the region x ∉ $O_y$, with a formula as follows:

$$K(u) = \begin{cases} \frac{1}{a} e^{-|u|/2\sigma^2} & |u| \le \rho \\ 0 & \text{otherwise} \end{cases};$$

Herein, u is a distance from any point x in the circular neighborhood $O_y$ to the circle center y, a is a normalization constant which realizes $\int K(u) = 1$, σ denotes a standard deviation of the Gaussian function, and ρ is a radius of the region $O_y$.

In the embodiment of the present disclosure, it only needs to divide the seismic attribute map into a target region (channel sedimentary facies) and a background region (non-channel sedimentary facies), so the classification number n is set to 2, i.e., the seismic attribute map Ω is divided into a first region $\Omega_1$ and a second region $\Omega_2$ orthogonal to each other. Assuming that the level set function is denoted by ϕ, the first region $\Omega_1$ and the second region $\Omega_2$ orthogonal to each other in the seismic attribute map may be respectively defined as:

$$\Omega_1 = \{x: \phi(x) > 0\};$$

$$\Omega_2 = \{x: \phi(x) < 0\};$$

In addition, the first region $\Omega_1$ and the second region $\Omega_2$ orthogonal to each other may also be expressed with member functions:

$$M_1(\phi)=H(\phi);$$

$$M_2(\phi)=1-H(\phi);$$

Herein, $H(\phi)$ denotes a Heaviside function.

The initial global energy function of the preliminary result of the seismic attribute map including the recognition result of the boundary of the sedimentary facies is determined based on the first region $\Omega_1$ and the second region $\Omega_2$ orthogonal to each other:

$$E_{image}(b, c, \phi) = \iint \left( \sum_{i=1}^{2} \int K(y-x)|I(x) - b(y)c_i|^2 M_i(\phi(x))dx \right) dy;$$

Herein, $E_{image}$ denotes an initial global energy function, b denotes a bias field, and $c_i$ denotes a grayscale information vector of a region i.

In order to fill the missed region in the identification result of the sedimentary facies in the seismic attribute map, a prior shape is introduced into the variational level set energy function of the conventional bias field to improve the segmentation accuracy, wherein the prior shape needs to be manually added by the geological expert, and represents the missed region considered to be filled by the geological expert. Firstly, a symbolic distance function is used to represent a prior shape $\psi$:

$$\psi(x, y) = \begin{cases} d[(x, y), c_0] & \text{outside the closed curve} \\ 0 & \text{on the closed curve} \\ -d[(x, y), c_0] & \text{inside the closed curve} \end{cases};$$

Herein, the function d(x, y) represents a distance from a pixel with coordinate values (x, y) in the seismic attribute map to an evolutionary trend contour $c_0$.

After the expression of the prior shape $\psi$ is determined, the prior shape-based constraint energy function is determined according to the prior shape $\psi$:

$$E_{shape} = \int_{\Omega} (H(\phi)-H(\psi))^2 dx;$$

After the initial global energy function $E_{image}$ and the prior shape-based constraint energy function $E_{shape}$ are determined, the prior shape-based global energy function is determined by the following formula according to the initial global energy function $E_{image}$ and the prior shape-based constraint energy function $E_{shape}$:

$$E=E_{image}+\lambda E_{shape};$$

Herein, $\lambda$ denotes a weight parameter of the prior shape-based constraint energy function $E_{shape}$ and $\lambda \geq 0$. In the embodiment of the present disclosure, the initial global energy function is determined based on the first region and the second region orthogonal to each other, and the prior shape-based constraint energy function is determined according to the prior shape, then the prior shape-based global energy function is further determined, into which the prior shape is introduced, so that the identification result of sedimentary facies belt boundaries in the seismic attribute map are smoother, and the accuracy of the identification result of the sedimentary facies belt boundaries is further improved.

Figure 9:
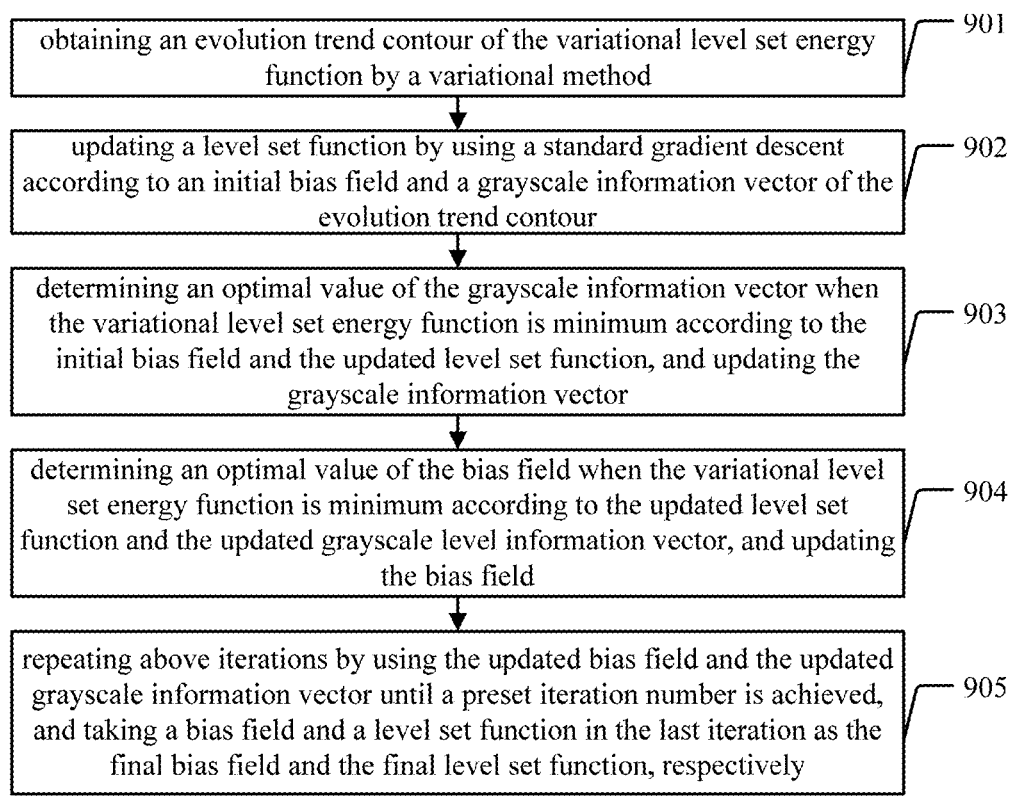
FIG. 9 is a flowchart of an implementation of step 703 in a method for identifying a boundary of a sedimentary facies provided in an embodiment of the present disclosure.

FIG. 9 shows a flowchart of an implementation of step 703 in the method for identifying a boundary of a sedimentary facies provided in the embodiment of the present disclosure. For the convenience of explanation, only the parts related to the embodiment of the present disclosure are illustrated, and the details are given as follows.

In an embodiment of the present disclosure, as shown in FIG. 9, step 703, i.e., estimating a final bias field and a final level set function when the variational level set energy function is minimum by using an iterative method comprises:

step 901: obtaining an evolution trend contour of the variational level set energy function by a variational method;

step 902: updating a level set function by using a standard gradient descent according to an initial bias field and a grayscale information vector of the evolution trend contour;

step 903: determining an optimal value of the grayscale information vector when the variational level set energy function is minimum according to the initial bias field and the updated level set function, and updating the grayscale information vector;

step 904: determining an optimal value of the bias field when the variational level set energy function is minimum according to the updated level set function and the updated grayscale level information vector, and updating the bias field;

step 905: repeating above iterations by using the updated bias field and the updated grayscale information vector until a preset iteration number is achieved, and taking a bias field and a level set function in the last iteration as the final bias field and the final level set function, respectively.

After the expression of the variational level set energy function is determined according to step 702, an evolution equation of the variational level set energy function can be obtained by the variational method. Herein, the variational method is a method to enable a function to obtain a maximum value or a minimum value. In the embodiment of the present disclosure, the variational method enables the variational level set energy function to obtain a minimum value. Herein, the evolution equation represents the variation trend of the evolution curve during each iteration, and the evolution curve is an evolution trend contour $c_0$ which may be defined as any initial shape. In the embodiment of the present disclosure, the initial shape of the evolution trend contour $c_0$ is defined as any circular region in the preliminary result of the seismic attribute map, and a circular region with a radius of 30 pixels in an upper left corner of the image is usually selected, but the selections of the radius and the position of the circular region have no influence on the final identification result of the boundary of the sedimentary facies.

The evolution equation of the variational level set energy function obtained by the variational method is as follows:

$$\frac{\partial \phi}{\partial t} = -\delta(\phi)(e1-e2) + \nu\delta(\phi)div\left(\frac{\nabla\phi}{|\nabla\phi|}\right) + \mu div(d_p(|\nabla\phi|)\nabla\phi) + \lambda(H(\phi) - H(\psi));$$

Herein, t denotes a time of a bias field iteration, $\delta(\cdot)$ denotes a Dirac function, i.e., $\delta(x)=0$, $(x\neq 0)$ $\int_{-\infty}^{+\infty}\delta(t)dt=1$; $\nabla$ denotes a gradient operator, div denotes a divergence operator, and a $d_p(\cdot)$ function denotes $$d_p(s) \triangleq \frac{p'(s)}{s};$$

v denotes a weight parameter of a contour length of a level set function of the seismic attribute map at a zero horizontal plane, and v≥0; µ denotes a weight parameter of a distance regular term, and µ≥0; and λ denotes a weight parameter of the prior shape-based constraint energy function. In one embodiment of the present disclosure, it is set that v=0.06, µ=0.001 and λ=0.001.

$e_i$ denotes grayscale level constraint information of the seismic attribute map, and its expression is as follows:

$$e_i(x) = \int K(y-x)|I(x)-b(y)c_i|^2 dy, (i=1,2);$$

In a case that the final bias field and the final level set function are determined by using the iterative method when the variational level set energy function is minimum, the grayscale information vector c of the evolution trend contour $c_0$ is obtained through the evolution trend contour $c_0$ of the variational level set energy function, and then the level set function is updated by using a standard gradient descent, under the given initial bias field b and the grayscale information vector c of the evolution trend contour $c_0$. Herein, the initial bias field b may be set in advance by persons skilled in the art according to the actual conditions and the specific requirements, which is not particularly limited in the embodiment of the present disclosure. In addition, the gradient descent is one of the iterative methods for solving a least squares problem, and the standard gradient descent is one of the gradient descents.

After the level set function ϕ is updated, an optimal value of the grayscale information vector c when the variational level set energy function achieves a minimum value, according to the initial bias field b and the updated level set function ϕ, and then the grayscale information vector c is updated, having an expression as follows:

$$c_i = \frac{\int (b \cdot K) IM_i(\phi(y)) dy}{\int (b^2 \cdot K) IM_i(\phi(y)) dy}, i = 1, 2;$$

Herein, K denotes the number of cluster centers in the K-means clustering of the seismic attribute map. Thus, after the updated grayscale information vector c is determined, an optimal value of the bias field b when the variational level set energy function achieves a minimum value, according to the updated level set function ϕ and the updated grayscale information vector c, and then the bias field b is updated, having an expression as follows:

$$b = \frac{K \cdot \left( I \sum_{i=1}^{2} c_i \mu_i(\phi) \right)}{K \cdot \left( I \sum_{i=1}^{2} c_i^2 \mu_i(\phi) \right)};$$

Herein, i denotes a clustering region, and $\mu_i(\phi)$ denotes a membership function of the clustering region i. After the updated bias field b and the updated grayscale information vector c are determined, the iterative steps 902 to 904 are repeated using the updated bias field b and the updated grayscale information vector c until a preset iteration number is satisfied, and then a bias field and a level set function of a last iteration are taken as the final bias field and the final level set function, respectively.

Herein, the preset iteration number is set in advance, and persons skilled in the art can understand that the preset iteration number may be set in advance according to the actual conditions and the specific requirements. For example, the iteration number may be set in advance to 100, or any other value such as 50 or 200, which is not particularly limited in the embodiment of the present disclosure.

In the embodiment of the present disclosure, until the iteration number is satisfied, the level set function, the grayscale information vector and the bias field are continuously updated using the iteration method, and then the final bias field and the final level set function after iteration are determined. The prior shape is introduced into the variational level set algorithm, and the final bias field and the final level set function are estimated using the iteration method, thereby further improving the accuracy of the identification result of the boundary of the sedimentary facies.

In an embodiment of the present disclosure, based on the steps of the method illustrated in FIG. 7, step 201, i.e., tracking the identification result of the boundary of the sedimentary facies using a prior shape-based bias field variational level set algorithm, to determine a final identification result of the boundary of the sedimentary facies in the seismic attribute map further comprises:

updating the prior shape to a current evolution trend contour every N iterations in a process of iteration; the current evolution trend contour being an evolution trend contour after the N iterations.

In the process of iteration, in order that an evolution of an artificially marked curve near the initial prior shape is smoother, and a shape of an artificially marked curve of an artificial connection region is well in conformity with a shape evolution trend between the sedimentary facies (e.g., channel sedimentary facies) in the seismic attribute map, it is necessary to update the prior shape to the current evolution trend contour every N iterations.

In the embodiment of the present disclosure, by updating the prior shape to the current evolution trend contour every N iterations, the evolution of the artificially marked curve near the artificial connection region is smoother, and the shape of the artificially marked curve of the artificial connection region is well in conformity with the shape evolution trend between the target regions.

In an embodiment of the present disclosure, based on the steps of the above method, step 201, i.e., tracking the identification result of the boundary of the sedimentary facies using a prior shape-based bias field variational level set algorithm, to determine a final identification result of the boundary of the sedimentary facies in the seismic attribute map further comprises:

updating the prior shape to an initial prior shape every M iterations in a process of iteration, wherein N and M are positive integers, and N is less than M.

Through further researches, the applicant finds that although the evolution of the artificially marked curve near the artificial connection region is smoother by updating the prior shape to the current evolution trend contour every M iterations, the evolution of the curve of the target region becomes inaccurate. Therefore, in order that the evolution of the curve of the target region becomes more accurate, it is necessary to update the prior shape to the initial prior shape every M iterations, so that the evolution of the curve of the target region is better in conformity with the boundary of the sedimentary facies in the seismic attribute map, wherein M and N satisfy a relationship that N is less than M.

In an embodiment of the present disclosure, the value of N is set to 10 and the value of M is set to 15 in advance. Persons skilled in the art will understand that the values of N and M may be set in advance to any values other than 10 for N and 15 for M. For example, the value of N is 8 and the value of M is 12, or the value of N is 12 and the value of M is 20, etc., which is not particularly limited in the embodiment of the present disclosure.

In the embodiment of the present disclosure, in the process of iteration, by updating the prior shape to the initial prior shape every N iterations, the evolution of the curve of the target region can become more accurate.

In order to explain the principle and effect of method for identifying a boundary of a sedimentary facies provided by the present disclosure more clearly, an actual seismic attribute map is taken as an example for explanation in the following embodiment.

Figure 10:
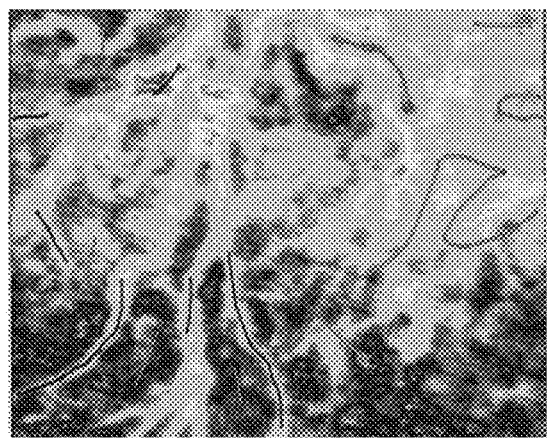
FIG. 10 is a schematic diagram of a preliminary marked result in a method for identifying a boundary of a sedimentary facies provided in an embodiment of the present disclosure.

FIG. 10 illustrates a preliminary marked result of an actual seismic attribute map provided in an embodiment of the present disclosure. For the convenience of explanation, only the parts related to the embodiment of the present disclosure are illustrated, and the details are given as follows:

As illustrated in FIG. 10, the discontinuous line segments of any lengths are a plurality of artificial markers input by a geological expert based on his experience knowledge to roughly distinguish and mark different types of sedimentary facies. For example, line segments of different colors may be adopted to represent different types of sedimentary facies.

Figure 11:
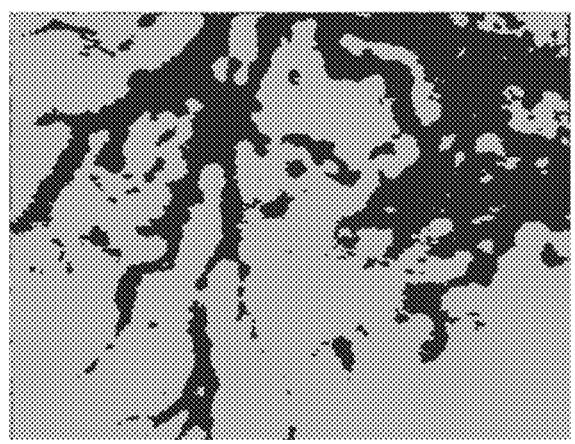
FIG. 11 is a schematic diagram of a K-means classification result in a method for identifying a boundary of a sedimentary facies provided in an embodiment of the present disclosure.

FIG. 11 illustrates a schematic diagram of a K-means classification result of an actual seismic attribute map provided in an embodiment of the present disclosure. For the convenience of explanation, only the parts related to the embodiment of the present disclosure are illustrated, and the details are given as follows:

FIG. 11 illustrates a K-means classification result obtained by a K-means clustering. In the embodiment of the present disclosure, the K-means classification result comprises two types of sedimentary facies with a large difference, i.e., the channel sedimentary facies (target region) and the non-channel sedimentary facies (background region).

Figure 12:
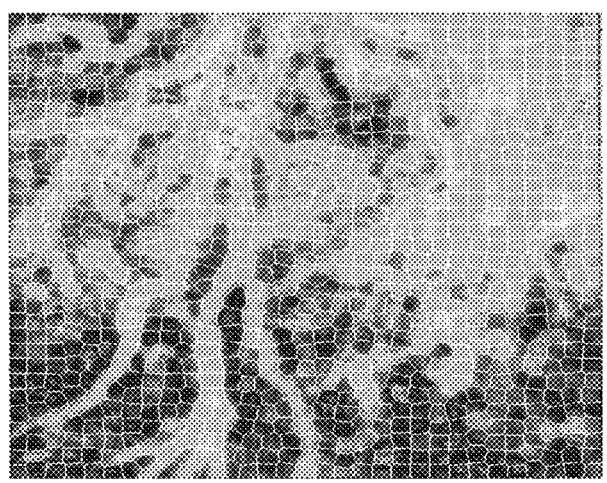
FIG. 12 is a schematic diagram of a super-pixel classification result in a method for identifying a boundary of a sedimentary facies provided in an embodiment of the present disclosure.

FIG. 12 illustrates a schematic diagram of a super-pixel classification result of an actual seismic attribute map provided in an embodiment of the present disclosure. For the convenience of explanation, only the parts related to the embodiment of the present disclosure are illustrated, and the details are given as follows:

FIG. 12 illustrates a super-pixel classification results obtained by an SLIC super-pixel segmentation. As illustrated, each super-pixel block includes a large number of pixels, and a few super-pixel blocks replace a large number of pixels to express features of the entire seismic attribute map, thereby greatly reducing the complexity of the identification of sedimentary facies identification and improving the efficiency of identification of the sedimentary facies.

Figure 13:
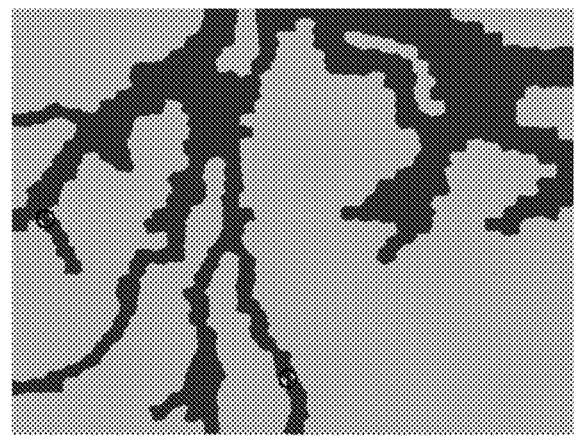
FIG. 13 is a schematic diagram of an identification result of boundary of the sedimentary facies in a method for identifying a boundary of a sedimentary facies provided in an embodiment of the present disclosure.

FIG. 13 illustrates a schematic diagram of an identification result of boundary of the sedimentary facies in an actual seismic attribute map provided in an embodiment of the present disclosure. For the convenience of explanation, only the parts related to the embodiment of the present disclosure are illustrated, and the details are given as follows:

FIG. 13 illustrates an identification result of boundary of the sedimentary facies in an actual seismic attribute map. As illustrated, the channel sedimentary facies and the non-channel sedimentary facies in the seismic attribute map have been well identified in the preliminary identification result of the sedimentary facies in the seismic attribute map, but a few discontinuous regions are still missed, such as those indicated with circles in FIG. 13.

Figure 14A:
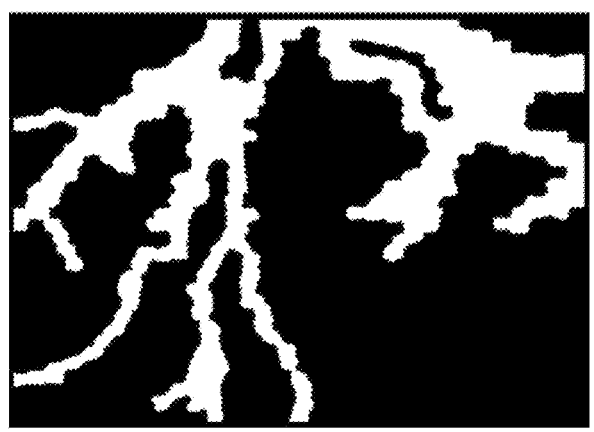
FIG. 14($a$) and FIG. 14($b$) are schematic diagrams of final identification results of boundary of the sedimentary facies in a method for identifying a boundary of a sedimentary facies provided in an embodiment of the present disclosure.

FIG. 14(a) illustrates a schematic diagram of a final identification result of boundary of the sedimentary facies in an actual seismic attribute map provided in an embodiment of the present disclosure. For the convenience of explanation, only the parts related to the embodiment of the present disclosure are illustrated, and the details are given as follows:

As illustrated in FIG. 14(a), a priori shape is introduced into a bias field variational level set algorithm to fill the missed and discontinuous parts of the channel sedimentary facies in the seismic attribute map, so that the boundary of the sedimentary facies in the final identification result of the seismic attribute map are more continuous and smoother.

Figure 14B:
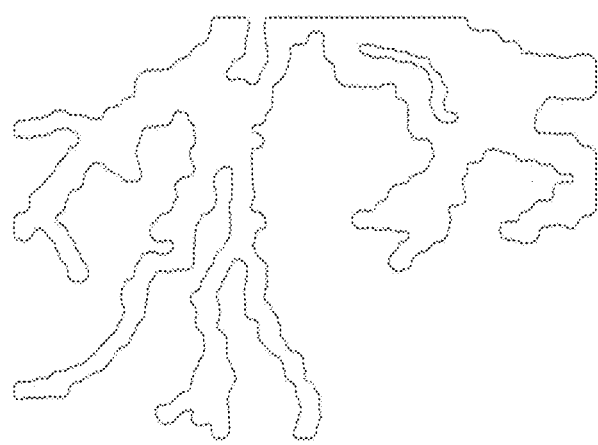

FIG. 14(b) illustrates a schematic diagram of a final identification result of boundary of the sedimentary facies in an actual seismic attribute map provided in an embodiment of the present disclosure. For the convenience of explanation, only the parts related to the embodiment of the present disclosure are illustrated, and the details are given as follows:

FIG. 14(b) illustrates the boundary of the sedimentary facies extracted and output from the final identification result of the seismic attribute map illustrated in FIG. 14(a). As illustrated, the boundary of the sedimentary facies finally output are smooth and continuous.

Figure 15:
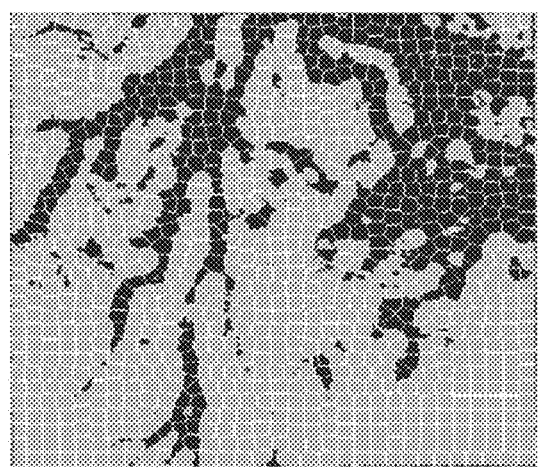
FIG. 15 is a schematic diagram of a superposition effect of a K-means classification result and a super-pixel classification result provided in an embodiment of the present disclosure.

FIG. 15 illustrates a schematic diagram of a superposition effect of a K-means classification result and a super-pixel classification result of an actual seismic attribute map provided in an embodiment of the present disclosure. For the convenience of explanation, only the parts related to the embodiment of the present disclosure are illustrated, and the details are given as follows:

FIG. 15 illustrates a superposition effect obtained by mapping the K-means classification result onto the super-pixel classification result. An order of magnitude of the pixels in the seismic attribute image is 100,000. As illustrated, after the K-means clustering and the SLIC super-pixel segmentation, the seismic attribute image is reduced to be of about 1,000 super-pixel blocks, which can greatly improve the efficiency of the region growing fusion stage and then improve the identification efficiency of the boundary of the sedimentary facies.

Figure 16A:
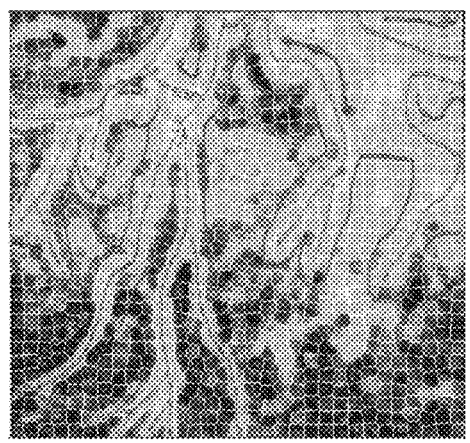
FIG. 16($a$) and FIG. 16($b$) are schematic diagrams of an actual seismic attribute map when artificial markers required to be input in the super-pixel segmentation are not used and an actual seismic attribute map when artificial markers required to be input in the super-pixel segmentation are used provided in an embodiment of the present disclosure.
Figure 16B:
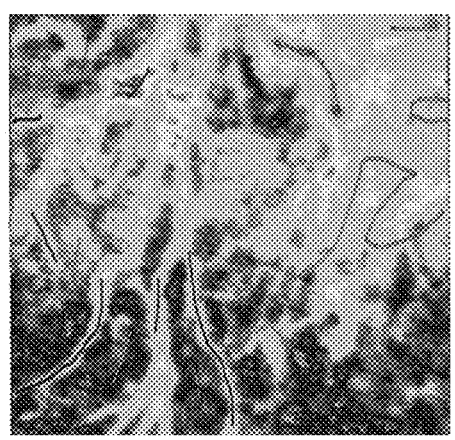

FIG. 16(a) illustrates a schematic diagram of an actual seismic attribute map when artificial markers required to be input in the super-pixel segmentation are not used provided in an embodiment of the present disclosure, and FIG. 16(b) illustrates a schematic diagram of an actual seismic attribute map when artificial markers required to be input in the super-pixel segmentation are used provided in an embodiment of the present disclosure. For the convenience of explanation, only the parts related to the embodiment of the present disclosure are illustrated, and the details are given as follows:

As illustrated in FIG. 16(a) and FIG. 16(b), it can be found by comparison that the number of artificial markers required to be input when the SLIC super-pixel segmentation is used in FIG. 16(b) is greatly less than the number of artificial markers required to be input when the SLIC super-pixel segmentation is not used in FIG. 16(a). It is clear that by using the SLIC super-pixel segmentation algorithm for the seismic attribute map, the number of the artificial markers input by the geological expert can be greatly reduced to improve the efficiency of identification of the sedimentary facies.

Figure 17:
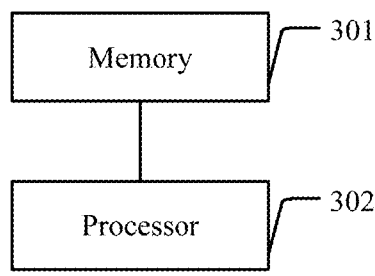
FIG. 17 is a diagram of a structure of a computer device provided in an embodiment of the present disclosure.

As illustrated in FIG. 17, an embodiment of the present disclosure further provides a computer device, comprising a memory 301, a processor 302, and a computer program stored in the memory 301 and executable by the processor 302. The processor 302 implements the following method when executing the computer program:

acquiring a preliminary marked result of the sedimentary facies in a seismic attribute map;

acquiring a color-based K-means classification result of the seismic attribute map by using a maximal between-cluster variance and a K-means clustering;

acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

In an embodiment of the present disclosure, the processor 302 further implements the following method when executing the computer program:

tracking the identification result of the boundary of the sedimentary facies using a prior shape-based bias field variational level set algorithm, to determine a final identification result of the boundary of the sedimentary facies in the seismic attribute map.

In an embodiment of the present disclosure, said acquiring a color-based K-means classification result of the seismic attribute map by using a maximal between-cluster variance and a K-means clustering comprises:

acquiring a classification result of the maximal between-cluster variance of the seismic attribute map by using the maximal between-cluster variance; and acquiring the color-based K-means classification result of the seismic attribute map through K-means clustering by taking an RGB average value of each cluster of the sedimentary facies in the classification result of the maximal between-cluster variance as an initial cluster center.

In an embodiment of the present disclosure, said acquiring a classification result of the maximal between-cluster variance of the seismic attribute map by using the maximal between-cluster variance comprises:

performing a grayscale processing on the seismic attribute map to obtain a seismic attribute grayscale map;

determining a proportion and an average grayscale of pixels having grayscale values not less than an initial pixel threshold value, and a proportion and an average grayscale of pixels having grayscale values less than the initial pixel threshold value, in the seismic attribute grayscale map, respectively;

determining a between-cluster variance according to the proportion and the average grayscale of the pixels having the grayscale values not less than the initial pixel threshold value, the proportion and the average grayscale of the pixels having the grayscale values less than the initial pixel threshold value, and a total average grayscale of the seismic attribute grayscale map;

determining, in a preset grayscale interval, a grayscale value which maximizes the between-cluster variance of the seismic attribute grayscale map, and updating a grayscale interval and a cluster number of the between-cluster variance;

if the updated number of clusters of the between-cluster variance is less than a preset number of clusters of the between-cluster variance, repeating above steps, continuing to determine, in the updated grayscale interval, a grayscale value which maximizes the between-cluster variance corresponding to the updated grayscale interval, and continuing to update the grayscale interval and the number of clusters of the between-cluster variance; and acquiring the classification result of the maximal between-cluster variance, until the updated number of clusters of the between-cluster variance is equal to the preset number of clusters of the between-cluster variance.

In an embodiment of the present disclosure, said acquiring the color-based K-means classification result of the seismic attribute map through K-means clustering by taking an RGB average value of each cluster of the sedimentary facies in the classification result of the maximal between-cluster variance as an initial cluster center comprises:

determining an RGB average value of all pixels included in each cluster of the sedimentary facies in the classification result of the maximal between-cluster variance and taking the RGB average value as a cluster center of K-means clustering; and determining a distance from each pixel in the seismic attribute map to any cluster centers, and fusing a pixel and a cluster center closest to the pixel, to form a new cluster center until the cluster center no longer changes, to obtain the color-based K-means classification result of the seismic attribute map.

In an embodiment of the present disclosure, said acquiring a super-pixel classification result of the seismic attribute map according to a SLIC super-pixel segmentation comprises:

taking a sampling result of the seismic attribute map on a regular sampling grid with an interval of S pixels as an initial super-pixel block center;

traversing each pixel in the seismic attribute map, and searching for super-pixel block centers within a first preset neighborhood range centered on each pixel; and determining a distance from each super-pixel block center to each pixel, and clustering each pixel and a cluster center closest to the pixel, until the super-pixel block no longer changes, to obtain the super-pixel classification result.

In an embodiment of the present disclosure, the processor 302 further implements the following method when executing the computer program:

before taking a sampling result of the seismic attribute map on a regular sampling grid with an interval of S pixels as an initial super-pixel block center, converting the seismic attribute map from an RGB color space to a LAB color space;

correspondingly, said taking a sampling result of the seismic attribute map on a regular sampling grid with an interval of S pixels as an initial super-pixel block center comprises:

taking a sampling result of the seismic attribute map converted into the LAB color space on a regular sampling grid with an interval of S pixels as an initial super-pixel block center.

In an embodiment of the present disclosure, the processor 302 further implements the following method when executing the computer program:

after taking a sampling result of the seismic attribute map on a regular sampling grid with an interval of S pixels as an initial super-pixel block center, adjusting the initial super-pixel block center to a position with a lowest gradient within a second preset neighborhood range, to obtain an adjusted super-pixel block center;

correspondingly, said traversing each pixel in the seismic attribute map, and searching for super-pixel block centers within a first preset neighborhood range centered on each pixel comprises:

traversing each pixel in the seismic attribute map, and searching for adjusted super-pixel block centers in the second preset neighborhood range.

In an embodiment of the present disclosure, said performing a region growing fusion on the super-pixel classification result by taking the preliminary marked result and the K-means classification result as constraints, to determine an identification result of the boundary of the sedimentary facies in the seismic attribute map comprises:

acquiring each marked super-pixel block and a super-pixel block set consisting of all adjacent super-pixel blocks; each marked super-pixel block and each unmarked super-pixel block being obtained by mapping the preliminary marked result of the seismic attribute map to the super-pixel classification result;

fusing each marked super-pixel block and its corresponding super-pixel block set into a new super-pixel block when said each marked super-pixel block and its corresponding super-pixel block set satisfy preset conditions; and repeating above steps until the super-pixel block set no longer changes, and obtaining the identification result of the boundary of the sedimentary facies in the seismic attribute map.

In an embodiment of the present disclosure, the preset conditions comprise:

super-pixel blocks included in a super-pixel block set corresponding to each marked super-pixel block are all unmarked super-pixel blocks; and a color type of each marked super-pixel block is the same as a color type of a center point of the super-pixel block set in the K-means classification result; and a distance from a center point of each marked super-pixel block to the center point of the corresponding super-pixel block set is not more than a preset distance threshold value.

In an embodiment of the present disclosure, said tracking the identification result of the boundary of the sedimentary facies using a prior shape-based bias field variational level set algorithm, to determine a final identification result of the boundary of the sedimentary facies in the seismic attribute map comprises:

determining a prior shape-based global energy function according to a prior shape of the identification result of the boundary of the sedimentary facies;

determining a variational level set energy function according to the prior shape-based global energy function;

estimating a final bias field and a final level set function when the variational level set energy function is minimum by using an iterative method; and determining the final identification result of the sedimentary facies in the seismic attribute map according to the final bias field and the final level set function.

In an embodiment of the present disclosure, said determining a prior shape-based global energy function according to a prior shape of the identification result of the boundary of the sedimentary facies comprises:

dividing a preliminary result of the seismic attribute map into a first region and a second region orthogonal to each other, and determining an initial global energy function of the preliminary result of the seismic attribute map based on the first region and the second region orthogonal to each other; the preliminary result of the seismic attribute map including the identification result of the boundary of the sedimentary facies;

determining a prior shape-based constraint energy function according to the prior shape; and determining a prior shape-based global energy function according to the initial global energy function of the seismic attribute map and the prior shape-based constraint energy function.

In an embodiment of the present disclosure, said estimating a final bias field and a final level set function when the variational level set energy function is minimum by using an iterative method comprises:

obtaining an evolution trend contour of the variational level set energy function by a variational method;

updating a level set function by using a standard gradient descent according to an initial bias field and a grayscale information vector of the evolution trend contour;

determining an optimal value of the grayscale information vector when the variational level set energy function is minimum according to the initial bias field and the updated level set function, and updating the grayscale information vector;

determining an optimal value of the bias field when the variational level set energy function is minimum according to the updated level set function and the updated grayscale level information vector, and updating the bias field; and repeating above iterations by using the updated bias field and the updated grayscale information vector until a preset iteration number is achieved, and taking a bias field and a level set function in the last iteration as the final bias field and the final level set function, respectively.

In an embodiment of the present disclosure, the processor 302 further implements the following method when executing the computer program:

updating the prior shape to a current evolution trend contour every N iterations in a process of iteration; the current evolution trend contour being an evolution trend contour after the N iterations.

In an embodiment of the present disclosure, the processor 302 further implements the following method when executing the computer program:

updating the prior shape to an initial prior shape every M iterations in a process of iteration, wherein N and M are positive integers, and N is less than M.

An embodiment of the present disclosure further provides a computer readable storage medium, which stores a computer program for executing the following method:

acquiring a preliminary marked result of the sedimentary facies in a seismic attribute map;

acquiring a color-based K-means classification result of the seismic attribute map by using a maximal between-cluster variance and a K-means clustering;

acquiring a super-pixel classification result of the seismic attribute map according to a SLIC super-pixel segmentation; and performing a region growing fusion on the super-pixel classification result by taking the preliminary marked result and the K-means classification result as constraints, to determine an identification result of the boundary of the sedimentary facies in the seismic attribute map.

In an embodiment of the present disclosure, the computer readable storage medium further stores a computer program for executing the following method:

tracking the identification result of the boundary of the sedimentary facies using a prior shape-based bias field variational level set algorithm, to determine a final identification result of the boundary of the sedimentary facies in the seismic attribute map.

In an embodiment of the present disclosure, said acquiring a color-based K-means classification result of the seismic attribute map by using a maximal between-cluster variance and a K-means clustering comprises:

acquiring a classification result of the maximal between-cluster variance of the seismic attribute map by using the maximal between-cluster variance; and acquiring the color-based K-means classification result of the seismic attribute map through K-means clustering by taking an RGB average value of each cluster of the sedimentary facies in the classification result of the maximal between-cluster variance as an initial cluster center.

In an embodiment of the present disclosure, said acquiring a classification result of the maximal between-cluster variance of the seismic attribute map by using the maximal between-cluster variance comprises:

performing a grayscale processing on the seismic attribute map to obtain a seismic attribute grayscale map;

determining a proportion and an average grayscale of pixels having grayscale values not less than an initial pixel threshold value, and a proportion and an average grayscale of pixels having grayscale values less than the initial pixel threshold value, in the seismic attribute grayscale map, respectively;

determining a between-cluster variance according to the proportion and the average grayscale of the pixels having the grayscale values not less than the initial pixel threshold value, the proportion and the average grayscale of the pixels having the grayscale values less than the initial pixel threshold value, and a total average grayscale of the seismic attribute grayscale map;

determining, in a preset grayscale interval, a grayscale value which maximizes the between-cluster variance of the seismic attribute grayscale map, and updating a grayscale interval and a cluster number of the between-cluster variance;

if the updated number of clusters of the between-cluster variance is less than a preset number of clusters of the between-cluster variance, repeating above steps, continuing to determine, in the updated grayscale interval, a grayscale value which maximizes the between-cluster variance corresponding to the updated grayscale interval, and continuing to update the grayscale interval and the number of clusters of the between-cluster variance; and acquiring the classification result of the maximal between-cluster variance, until the updated number of clusters of the between-cluster variance is equal to the preset number of clusters of the between-cluster variance.

In one embodiment of the present disclosure, said acquiring the color-based K-means classification result of the seismic attribute map through K-means clustering by taking an RGB average value of each cluster of the sedimentary facies in the classification result of the maximal between-cluster variance as an initial cluster center comprises:

determining an RGB average value of all pixels included in each cluster of the sedimentary facies in the classification result of the maximal between-cluster variance and taking the RGB average value as a cluster center of K-means clustering; and determining a distance from each pixel in the seismic attribute map to any cluster centers, and fusing a pixel and a cluster center closest to the pixel, to form a new cluster center until the cluster center no longer changes, to obtain the color-based K-means classification result of the seismic attribute map.

In an embodiment of the present disclosure, said acquiring a super-pixel classification result of the seismic attribute map according to a SLIC super-pixel segmentation comprises:

taking a sampling result of the seismic attribute map on a regular sampling grid with an interval of S pixels as an initial super-pixel block center;

traversing each pixel in the seismic attribute map, and searching for super-pixel block centers within a first preset neighborhood range centered on each pixel; and determining a distance from each super-pixel block center to each pixel, and clustering each pixel and a cluster center closest to the pixel, until the super-pixel block no longer changes, to obtain the super-pixel classification result.

In an embodiment of the present disclosure, the computer readable storage medium further stores a computer program for executing the following method:

before taking a sampling result of the seismic attribute map on a regular sampling grid with an interval of S pixels as an initial super-pixel block center, converting the seismic attribute map from an RGB color space to a LAB color space;

correspondingly, said taking a sampling result of the seismic attribute map on a regular sampling grid with an interval of S pixels as an initial super-pixel block center comprises:

taking a sampling result of the seismic attribute map converted into the LAB color space on a regular sampling grid with an interval of S pixels as an initial super-pixel block center.

In an embodiment of the present disclosure, the computer readable storage medium further stores a computer program for executing the following method:

after taking a sampling result of the seismic attribute map on a regular sampling grid with an interval of S pixels as an initial super-pixel block center, adjusting the initial super-pixel block center to a position with a lowest gradient within a second preset neighborhood range, to obtain an adjusted super-pixel block center;

correspondingly, said traversing each pixel in the seismic attribute map, and searching for super-pixel block centers within a first preset neighborhood range centered on each pixel comprises:

traversing each pixel in the seismic attribute map, and searching for adjusted super-pixel block centers in the second preset neighborhood range.

In an embodiment of the present disclosure, said performing a region growing fusion on the super-pixel classification result by taking the preliminary marked result and the K-means classification result as constraints, to determine an identification result of the boundary of the sedimentary facies in the seismic attribute map comprises:

acquiring each marked super-pixel block and a super-pixel block set consisting of all adjacent super-pixel blocks; each marked super-pixel block and each unmarked super-pixel block being obtained by mapping the preliminary marked result of the seismic attribute map to the super-pixel classification result;

fusing each marked super-pixel block and its corresponding super-pixel block set into a new super-pixel block when said each marked super-pixel block and its corresponding super-pixel block set satisfy preset conditions; and repeating above steps until the super-pixel block set no longer changes, and obtaining the identification result of the boundary of the sedimentary facies in the seismic attribute map.

In an embodiment of the present disclosure, the preset conditions comprise:

super-pixel blocks included in a super-pixel block set corresponding to each marked super-pixel block are all unmarked super-pixel blocks; and a color type of each marked super-pixel block is the same as a color type of a center point of the super-pixel block set in the K-means classification result; and a distance from a center point of each marked super-pixel block to the center point of the corresponding super-pixel block set is not more than a preset distance threshold value.

In an embodiment of the present disclosure, said tracking the identification result of the boundary of the sedimentary facies using a prior shape-based bias field variational level set algorithm, to determine a final identification result of the boundary of the sedimentary facies in the seismic attribute map comprises:

determining a prior shape-based global energy function according to a prior shape of the identification result of the boundary of the sedimentary facies;

determining a variational level set energy function according to the prior shape-based global energy function;

estimating a final bias field and a final level set function when the variational level set energy function is minimum by using an iterative method; and determining the final identification result of the sedimentary facies in the seismic attribute map according to the final bias field and the final level set function.

In an embodiment of the present disclosure, said determining a prior shape-based global energy function according to a prior shape of the identification result of the boundary of the sedimentary facies comprises:

dividing a preliminary result of the seismic attribute map into a first region and a second region orthogonal to each other, and determining an initial global energy function of the preliminary result of the seismic attribute map based on the first region and the second region orthogonal to each other; the preliminary result of the seismic attribute map including the identification result of the boundary of the sedimentary facies;

determining a prior shape-based constraint energy function according to the prior shape; and determining a prior shape-based global energy function according to the initial global energy function of the seismic attribute map and the prior shape-based constraint energy function.

In an embodiment of the present disclosure, said estimating a final bias field and a final level set function when the variational level set energy function is minimum by using an iterative method comprises:

obtaining an evolution trend contour of the variational level set energy function by a variational method;

updating a level set function by using a standard gradient descent according to an initial bias field and a grayscale information vector of the evolution trend contour;

determining an optimal value of the grayscale information vector when the variational level set energy function is minimum according to the initial bias field and the updated level set function, and updating the grayscale information vector;

determining an optimal value of the bias field when the variational level set energy function is minimum according to the updated level set function and the updated grayscale level information vector, and updating the bias field; and repeating above iterations by using the updated bias field and the updated grayscale information vector until a preset iteration number is achieved, and taking a bias field and a level set function in the last iteration as the final bias field and the final level set function, respectively.

In an embodiment of the present disclosure, the computer readable storage medium further stores a computer program for executing the following method:

updating the prior shape to a current evolution trend contour every N iterations in a process of iteration; the current evolution trend contour being an evolution trend contour after the N iterations.

In an embodiment of the present disclosure, the computer readable storage medium further stores a computer program for executing the following method:

updating the prior shape to an initial prior shape every M iterations in a process of iteration, wherein N and M are positive integers, and N is less than M.

In conclusion, in the embodiments of the present disclosure, the geological expert only requires to add a few artificial markers on the preliminary marked result. And in the SLIC super-pixel segmentation, a large number of pixels are replaced with a few super-pixels to express the features of the seismic attribute map, and the preliminary marked result and the K-means classification result are taken as constraints at the same time, thereby greatly reducing the number of the artificial markers, and largely improving the efficiency in the identification of the boundary of the sedimentary facies. In addition, the color-based K-means classification result of the seismic attribute map can be obtained by using the maximal between-cluster variance and the K-means clustering, thereby improving the accuracy and efficiency of clustering. Meanwhile, the preliminary marked result from the geological expert is taken as constraints, which can offset the inaccuracy of the data and largely improve the accuracy of the identification of the boundary of the sedimentary facies.

Persons skilled in the art will appreciate that the embodiments of the present disclosure may be provided as a method, a system, or a computer program product. Thus the present disclosure may adopt the form of complete hardware embodiment, complete software embodiment, or software and hardware combined embodiment. In addition, the present disclosure may adopt the form of a computer program product which is implementable in one or more computer readable storage mediums (including, but not limited to, magnetic disk memory, CD-ROM, optical memory, etc.) containing computer readable program codes therein.

The present disclosure is described with reference to the flowcharts and/or block diagrams of the method, device (system) and computer program product according to the embodiments of the present disclosure. It shall be appreciated that each flow and/or block in the flowchart and/or block diagram, and the combinations of the flows and/or blocks in the flowchart and/or block diagram can be implemented through computer program instructions. The computer program instructions may be provided to a general computer, a dedicated computer, an embedded processor or a processor of other programmable data processing device, to form a machine so that the instructions, which are executed through the computer or the processor of other programmable data processing device, generate means for realizing the functions specified in one or more flows in the flowchart and one or more blocks in the block diagram.

The computer program instructions may also be stored in a computer readable memory which is capable of guiding the computer or other programmable data processing device to work in a specific mode, so that the instructions stored in the computer readable memory generate a product including instructing means for realizing the functions specified in one or more flows in the flowchart and one or more blocks in the block diagram.

The computer program instructions may also be loaded to the computer or other programmable data processing device, so that a series of operation steps can be performed in the computer or other programmable device to generate a processing realized by the computer, thus the instructions executed in the computer or other programmable device provide the steps for realizing the functions specified in one or more flows in the flowchart and one or more blocks in the block diagram.

The specific embodiments described above have further explained the objectives, technical solutions and advantageous effects of the present disclosure in detail. It should be understood that those described above are only specific embodiments of the present disclosure, rather than limitations to the protection scope of the present disclosure. Any modification, equivalent substitution, improvement, etc. made within the spirit and principle of the present disclosure should fall within the protection scope of the present disclosure.

What is claimed is:

1. A method for identifying a boundary of a sedimentary facies, comprising:
   acquiring a preliminary marked result of the sedimentary facies in a seismic attribute map;
   acquiring a color-based K-means classification result of the seismic attribute map by using a maximal between-cluster variance and a K-means clustering;
   acquiring a super-pixel classification result of the seismic attribute map according to a SLIC super-pixel segmentation; and
   performing a region growing fusion on the super-pixel classification result by taking the preliminary marked result and the K-means classification result as constraints, to determine an identification result of the boundary of the sedimentary facies in the seismic attribute map.

2. The method for identifying a boundary of a sedimentary facies according to claim 1, further comprising:
   tracking the identification result of the boundary of the sedimentary facies using a prior shape-based bias field variational level set algorithm, to determine a final identification result of the boundary of the sedimentary facies in the seismic attribute map.

3. The method for identifying a boundary of a sedimentary facies according to claim 1, wherein said acquiring a color-based K-means classification result of the seismic attribute map by using a maximal between-cluster variance and a K-means clustering comprises:
   acquiring a classification result of the maximal between-cluster variance of the seismic attribute map by using the maximal between-cluster variance; and
   acquiring the color-based K-means classification result of the seismic attribute map through K-means clustering by taking an RGB average value of each cluster of the sedimentary facies in the classification result of the maximal between-cluster variance as an initial cluster center.

4. The method for identifying a boundary of a sedimentary facies according to claim 3, wherein said acquiring a classification result of the maximal between-cluster variance of the seismic attribute map by using the maximal between-cluster variance comprises:
   performing a grayscale processing on the seismic attribute map to obtain a seismic attribute grayscale map;
   determining a proportion and an average grayscale of pixels having grayscale values not less than an initial pixel threshold value, and a proportion and an average grayscale of pixels having grayscale values less than the initial pixel threshold value, in the seismic attribute grayscale map, respectively;
   determining a between-cluster variance according to the proportion and the average grayscale of the pixels having the grayscale values not less than the initial pixel threshold value, the proportion and the average grayscale of the pixels having the grayscale values less than the initial pixel threshold value, and a total average grayscale of the seismic attribute grayscale map;
   determining, in a preset grayscale interval, a grayscale value which maximizes the between-cluster variance of the seismic attribute grayscale map, and updating a grayscale interval and a cluster number of the between-cluster variance;
   if the updated number of clusters of the between-cluster variance is less than a preset number of clusters of the between-cluster variance, repeating above steps, continuing to determine, in the updated grayscale interval, a grayscale value which maximizes the between-cluster variance corresponding to the updated grayscale interval, and continuing to update the grayscale interval and the number of clusters of the between-cluster variance; and
   acquiring the classification result of the maximal between-cluster variance, until the updated number of clusters of the between-cluster variance is equal to the preset number of clusters of the between-cluster variance.

5. The method for identifying a boundary of a sedimentary facies according to claim 3, wherein said acquiring the color-based K-means classification result of the seismic attribute map through K-means clustering by taking an RGB average value of each cluster of the sedimentary facies in the classification result of the maximal between-cluster variance as an initial cluster center comprises:
   determining an RGB average value of all pixels included in each cluster of the sedimentary facies in the classification result of the maximal between-cluster variance and taking the RGB average value as a cluster center of K-means clustering; and
   determining a distance from each pixel in the seismic attribute map to any cluster centers, and fusing a pixel and a cluster center closest to the pixel, to form a new cluster center until the cluster center no longer changes, to obtain the color-based K-means classification result of the seismic attribute map.

6. The method for identifying a boundary of a sedimentary facies according to claim 1, wherein said acquiring a super-pixel classification result of the seismic attribute map according to a SLIC super-pixel segmentation comprises:
   taking a sampling result of the seismic attribute map on a regular sampling grid with an interval of S pixels as an initial super-pixel block center;
   traversing each pixel in the seismic attribute map, and searching for super-pixel block centers within a first preset neighborhood range centered on each pixel; and
   determining a distance from each super-pixel block center to each pixel, and clustering each pixel and a cluster center closest to the pixel, until the super-pixel block no longer changes, to obtain the super-pixel classification result.

7. The method for identifying a boundary of a sedimentary facies according to claim 6, wherein before taking a sampling result of the seismic attribute map on a regular sampling grid with an interval of S pixels as an initial super-pixel block center, the method further comprises:
- converting the seismic attribute map from an RGB color space to a LAB color space;
- correspondingly, said taking a sampling result of the seismic attribute map on a regular sampling grid with an interval of S pixels as an initial super-pixel block center comprises:
- taking a sampling result of the seismic attribute map converted into the LAB color space on a regular sampling grid with an interval of S pixels as an initial super-pixel block center.

8. The method for identifying a boundary of a sedimentary facies according to claim 6, wherein after taking a sampling result of the seismic attribute map on a regular sampling grid with an interval of S pixels as an initial super-pixel block center, the method further comprises:
- adjusting the initial super-pixel block center to a position with a lowest gradient within a second preset neighborhood range, to obtain an adjusted super-pixel block center;
- correspondingly, said traversing each pixel in the seismic attribute map, and searching for super-pixel block centers within a first preset neighborhood range centered on each pixel comprises:
- traversing each pixel in the seismic attribute map, and searching for adjusted super-pixel block centers in the second preset neighborhood range.

9. The method for identifying a boundary of a sedimentary facies according to claim 1, wherein said performing a region growing fusion on the super-pixel classification result by taking the preliminary marked result and the K-means classification result as constraints, to determine an identification result of the boundary of the sedimentary facies in the seismic attribute map comprises:
- acquiring each marked super-pixel block and a super-pixel block set consisting of all adjacent super-pixel blocks; each marked super-pixel block and each unmarked super-pixel block being obtained by mapping the preliminary marked result of the seismic attribute map to the super-pixel classification result;
- fusing each marked super-pixel block and its corresponding super-pixel block set into a new super-pixel block when said each marked super-pixel block and its corresponding super-pixel block set satisfy preset conditions; and
- repeating above steps until the super-pixel block set no longer changes, and obtaining the identification result of the boundary of the sedimentary facies in the seismic attribute map.

10. The method for identifying a boundary of a sedimentary facies according to claim 9, wherein the preset conditions comprise:
- super-pixel blocks included in a super-pixel block set corresponding to each marked super-pixel block are all unmarked super-pixel blocks; and
- a color type of each marked super-pixel block is the same as a color type of a center point of the super-pixel block set in the K-means classification result; and
- a distance from a center point of each marked super-pixel block to the center point of the corresponding super-pixel block set is not more than a preset distance threshold value.

11. The method for identifying a boundary of a sedimentary facies according to claim 2, wherein said tracking the identification result of the boundary of the sedimentary facies using a prior shape-based bias field variational level set algorithm, to determine a final identification result of the boundary of the sedimentary facies in the seismic attribute map comprises:
- determining a prior shape-based global energy function according to a prior shape of the identification result of the boundary of the sedimentary facies;
- determining a variational level set energy function according to the prior shape-based global energy function;
- estimating a final bias field and a final level set function when the variational level set energy function is minimum by using an iterative method; and
- determining the final identification result of the sedimentary facies in the seismic attribute map according to the final bias field and the final level set function.

12. The method for identifying a boundary of a sedimentary facies according to claim 11, wherein said determining a prior shape-based global energy function according to a prior shape of the identification result of the boundary of the sedimentary facies comprises:
- dividing a preliminary result of the seismic attribute map into a first region and a second region orthogonal to each other, and determining an initial global energy function of the preliminary result of the seismic attribute map based on the first region and the second region orthogonal to each other; the preliminary result of the seismic attribute map including the identification result of the boundary of the sedimentary facies;
- determining a prior shape-based constraint energy function according to the prior shape; and
- determining a prior shape-based global energy function according to the initial global energy function of the seismic attribute map and the prior shape-based constraint energy function.

13. The method for identifying a boundary of a sedimentary facies according to claim 11, wherein said estimating a final bias field and a final level set function when the variational level set energy function is minimum by using an iterative method comprises:
- obtaining an evolution trend contour of the variational level set energy function by a variational method;
- updating a level set function by using a standard gradient descent according to an initial bias field and a grayscale information vector of the evolution trend contour;
- determining an optimal value of the grayscale information vector when the variational level set energy function is minimum according to the initial bias field and the updated level set function, and updating the grayscale information vector;
- determining an optimal value of the bias field when the variational level set energy function is minimum according to the updated level set function and the updated grayscale level information vector, and updating the bias field; and
- repeating above iterations by using the updated bias field and the updated grayscale information vector until a preset iteration number is achieved, and taking a bias field and a level set function in the last iteration as the final bias field and the final level set function, respectively.

14. The method for identifying a boundary of a sedimentary facies according to claim 11, further comprising:
- updating the prior shape to a current evolution trend contour every N iterations in a process of iteration; the current evolution trend contour being an evolution trend contour after the N iterations.

15. The method for identifying a boundary of a sedimentary facies according to claim 14, further comprising:
updating the prior shape to an initial prior shape every M iterations in a process of iteration, wherein N and M are positive integers, and N is less than M.

16. A computer device, comprising a memory, a processor, and a computer program stored in the memory and executable by the processor, wherein the processor implements the following method when executing the computer program:
acquiring a preliminary marked result of the sedimentary facies in a seismic attribute map;
acquiring a color-based K-means classification result of the seismic attribute map by using a maximal between-cluster variance and a K-means clustering;
acquiring a super-pixel classification result of the seismic attribute map according to a SLIC super-pixel segmentation; and
performing a region growing fusion on the super-pixel classification result by taking the preliminary marked result and the K-means classification result as constraints, to determine an identification result of the boundary of the sedimentary facies in the seismic attribute map.

17. The computer device according to claim 16, wherein the processor implements the following method when executing the computer program:
tracking the identification result of the boundary of the sedimentary facies using a prior shape-based bias field variational level set algorithm, to determine a final identification result of the boundary of the sedimentary facies in the seismic attribute map.

18. The computer device according to claim 16, wherein said acquiring a color-based K-means classification result of the seismic attribute map by using a maximal between-cluster variance and a K-means clustering comprises:
acquiring a classification result of the maximal between-cluster variance of the seismic attribute map by using the maximal between-cluster variance; and
acquiring the color-based K-means classification result of the seismic attribute map through K-means clustering by taking an RGB average value of each cluster of the sedimentary facies in the classification result of the maximal between-cluster variance as an initial cluster center.

19. A non-transitory computer-readable storage medium, wherein the computer-readable storage medium stores a computer program for executing the following method:
acquiring a preliminary marked result of the sedimentary facies in a seismic attribute map;
acquiring a color-based K-means classification result of the seismic attribute map by using a maximal between-cluster variance and a K-means clustering;
acquiring a super-pixel classification result of the seismic attribute map according to a SLIC super-pixel segmentation; and
performing a region growing fusion on the super-pixel classification result by taking the preliminary marked result and the K-means classification result as constraints, to determine an identification result of the boundary of the sedimentary facies in the seismic attribute map.

20. The non-transitory computer-readable storage medium according to claim 19, wherein the computer readable storage medium further stores the computer program for executing the following method:
tracking the identification result of the boundary of the sedimentary facies using a prior shape-based bias field variational level set algorithm, to determine a final identification result of the boundary of the sedimentary facies in the seismic attribute map.

* * * * *